(12) United States Patent
Andrews

(10) Patent No.: US 6,574,736 B1
(45) Date of Patent: Jun. 3, 2003

(54) COMPOSABLE ROLES

(75) Inventor: Anthony D. Andrews, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,061

(22) Filed: Nov. 30, 1998

(51) Int. Cl.$^7$ .......................... G06F 12/14; G06F 7/00; G06F 9/00

(52) U.S. Cl. ...................... 713/201; 709/332; 709/227; 707/100

(58) Field of Search ................................ 713/201, 200; 709/332, 331, 227; 707/100

(56) References Cited

U.S. PATENT DOCUMENTS

| | | |
|---|---|---|
| 4,752,928 A | 6/1988 | Chapman et al. |
| 4,807,111 A | 2/1989 | Cohen et al. |
| 5,016,166 A | 5/1991 | Van Loo et al. |
| 5,075,848 A | 12/1991 | Lai et al. |
| 5,093,914 A | 3/1992 | Coplien et al. |
| 5,125,091 A | 6/1992 | Staas, Jr. et al. |
| 5,133,075 A | 7/1992 | Risch |
| 5,151,987 A | 9/1992 | Abraham et al. |
| 5,168,441 A | 12/1992 | Onarheim et al. |
| 5,179,702 A | 1/1993 | Spix et al. |
| 5,181,162 A | 1/1993 | Smith et al. |
| 5,210,874 A | 5/1993 | Karger |
| 5,212,793 A | 5/1993 | Donica et al. |
| 5,247,675 A | 9/1993 | Farrell et al. |
| 5,313,638 A | 5/1994 | Ogle et al. |
| 5,315,703 A | 5/1994 | Matheny et al. |
| 5,339,415 A | 8/1994 | Strout, II et al. |
| 5,421,013 A | 5/1995 | Smith |
| 5,434,975 A | 7/1995 | Allen |
| 5,442,791 A | 8/1995 | Wrabetz et al. |
| 5,455,953 A | 10/1995 | Russell |

(List continued on next page.)

FOREIGN PATENT DOCUMENTS

| | | |
|---|---|---|
| EP | 0559100 A2 | 2/1993 |
| EP | 0638863 A1 | 8/1994 |
| EP | 0777178 A1 | 4/1997 |

OTHER PUBLICATIONS

Brockschmidt, "Chapter Six, Local/Remote Transparency," *Inside Ole,* 2d Ed., pp. 277–338 (1995).

Go, "Intranet load–balancing solutions: Balance on the back end," *Infoworld,* pp. 72–86 (Mar. 1998).

Horstmann et al., "DCOM Architecture," Microsoft Press, pp. 1–55 (Jul. 1997).

Lam, "Building Scalable Apps," *PC Magazine,* pp. 209–214 (Apr. 1998).

(List continued on next page.)

*Primary Examiner*—Norman M. Wright
(74) *Attorney, Agent, or Firm*—Klarquist Sparkman, LLP

(57) ABSTRACT

An application developer grants access privileges to application processing services in an object-based application by defining logical classes of users called roles. When the application is deployed on a host computer system, an administrator populates the roles with users and groups recognized by the host computer system. At runtime, a user is not permitted access to a processing service unless the user is a member of a permitted role for the processing service. To ease administration, two or more roles can be composed. In one implementation, roles are associated with a separate composite role. The administrator can then populate the composite role instead of individually populating each of the roles associated with the composite role. In another implementation, the administrator can specify that a role follows another role; user identities in the followed role are automatically considered members of the following role. Additional features include an installation utility to help compose roles when installing an application on the host computer system. An exemplary security framework for implementing composable roles relieves application developers from including security logic in application components.

27 Claims, 20 Drawing Sheets

U.S. PATENT DOCUMENTS

| | | | |
|---|---|---|---|
| 5,459,837 A | 10/1995 | Caccavale | |
| 5,463,625 A | 10/1995 | Yasrebi | |
| 5,481,715 A | 1/1996 | Hamilton et al. | 395/700 |
| 5,485,617 A | 1/1996 | Stutz et al. | |
| 5,493,728 A | 2/1996 | Solton et al. | |
| 5,504,898 A | 4/1996 | Klein | |
| 5,519,867 A | 5/1996 | Moeller et al. | |
| 5,524,238 A | 6/1996 | Miller et al. | |
| 5,555,368 A | 9/1996 | Orton et al. | |
| 5,555,388 A | 9/1996 | Shaughnessy | |
| 5,560,029 A | 9/1996 | Papadopoulos et al. | |
| 5,574,862 A | 11/1996 | Marianetti, II | |
| 5,574,918 A | 11/1996 | Hurley et al. | |
| 5,577,251 A | 11/1996 | Hamilton et al. | 395/942.07 |
| 5,577,252 A | 11/1996 | Nelson et al. | 395/670 |
| 5,579,520 A | 11/1996 | Bennett | |
| 5,581,760 A | 12/1996 | Atkinson et al. | |
| 5,598,562 A | 1/1997 | Cutler et al. | |
| 5,603,063 A | 2/1997 | Au | |
| 5,630,136 A | 5/1997 | Davidson et al. | |
| 5,675,796 A | 10/1997 | Hodges et al. | |
| 5,687,370 A | 11/1997 | Garst et al. | |
| 5,689,708 A | 11/1997 | Regnier et al. | 395/682 |
| 5,717,439 A | 2/1998 | Levine et al. | |
| 5,742,822 A | 4/1998 | Motomura | |
| 5,752,038 A | 5/1998 | Blake et al. | |
| 5,765,174 A | 6/1998 | Bishop | |
| 5,778,365 A | 7/1998 | Nishiyama | |
| 5,787,281 A | 7/1998 | Schreiber et al. | |
| 5,790,789 A | 8/1998 | Suarez | |
| 5,794,038 A | 8/1998 | Stutz et al. | |
| 5,802,291 A | 9/1998 | Balick et al. | |
| 5,815,665 A | 9/1998 | Teper et al. | |
| 5,822,435 A | 10/1998 | Boebert et al. | 380/49 |
| 5,832,274 A | 11/1998 | Cutler et al. | 395/712 |
| 5,838,916 A | 11/1998 | Domenikos et al. | 395/200.49 |
| 5,864,683 A | 1/1999 | Boebert et al. | |
| 5,881,225 A | 3/1999 | Worth | |
| 5,884,316 A | 3/1999 | Bernstein et al. | |
| 5,889,942 A | 3/1999 | Orenshteyn | |
| 5,890,161 A | 3/1999 | Helland et al. | 703/103 |
| 5,907,675 A | 5/1999 | Aahlad | |
| 5,941,947 A | 8/1999 | Brown et al. | |
| 5,958,010 A | 9/1999 | Agarwal et al. | |
| 6,014,666 A | 1/2000 | Helland et al. | |
| 6,026,428 A | 2/2000 | Hutchison et al. | |
| 6,061,796 A | 5/2000 | Chen et al. | |
| 6,105,147 A | 8/2000 | Molloy | |
| 6,134,594 A | 10/2000 | Helland et al. | |
| 6,167,423 A | 12/2000 | Chopra et al. | |
| 6,182,108 B1 | 1/2001 | Williams et al. | |

OTHER PUBLICATIONS

*Microsoft, Windows NT®Server,* Server Operating System, White Paper, DCOM Technical Overview, pp. 1–43 (Apr. 1998).

Nance, "Balance the load with Transaction Server," *BYTE Magazine,* pp. 1–8 (Jun. 1997).

Orfali et al., "COM:Ole's Object Bus," *The Essential Distributed Objects Survival Guide,* Ch. 25, pp. 425–452 (1996).

Orfali et al., "CORBA Services; System Management and Security," *The Essential Distributed Objects Survival Guide,* Ch. 10, pp. 183–202 (1996).

Nierstrasz, "Active Objects Hybrid," *Proceedings of OOPSLA 1987,* 22:12, pp. 243–253 Oct. 4–8 (Dec. 1987).

Orfali et al., Ch. 9, "RPC, Messaging, and Peer–to–Peer," *Essential Client/Server Survival Guide,* John Wiley & Sons, Inc., pp. 119–128 (1994).

Hamilton (Ed.), "JavaBeans™" *Sun Microsystems,* Version 1.01, pp. 1–114 (Jul. 1997).

Hurwicz, "Multicast to the Masses: The IP Multicast standard is ready, but the infrastructure isn't. Yet.," *BYTE Magazine,* pp. 1–10 (Jun. 1997).

"Managing Performance/Reliabity Trade–Offs," *BYTE Magazine,* Reviews, pp. 1–2 (Feb. 1998).

"Monkey in the Middleware," *BYTE Magazine,* Reviews, pp. 1–2 (Feb. 1998).

Montgomery, "Distributing Components: For CORBA and DCOM its time to get practical.," *BYTE Magazine,* Special Report, pp. 1–10 and illustrations "DCOM Architecture" and "CORBA Architecture" (Apr. 1997).

Skeen, "Enabling the Real–Time Enterprise," *BYTE Magazine,* Core Technologies, pp. 1–5 and illustrations "Reliable Multicast Protocol in Action" and "Multilevel Caching Over a WAN" (Jan. 1998).

Neumann, "Security and Privacy Issues in Computer and Communication Systems," Ch. 89, *The Computer Science and Engineering Handbook,* (Tucker, Ed.), pp. 1910–1913 (1997).

Landwehr, Protection (Security) Models and Policy, Ch. 90, *The Computer Science and Engineering Handbook,* (Tucker, Ed.), pp. 1914–1928 (1997).

Sandhu et al., "Authentication, Access Control, and Intrusion Detection," Ch. 91, *The Computer Science and Engineering Handbook,* (Tucker, Ed.), pp. 1929–1948 (1997).

Bellovin, "Network and Internet Security," Ch. 92, *The Computer Science and Engineering Handbook,* (Tucker, Ed.), pp. 1949–1961 (1997).

Jajodia, "Database Security and Privacy," Ch. 49, *The Computer Science and Engineering Handbook,* (Tucker, Ed.), pp. 1112–1124 (1997).

McKay, "Microsoft talks up tools" *InfoWorld,* 20:19, 2 pp. (May 11, 1998).

Matena et al., "Enterprise JavaBeans™," Version 1.0 Specification, *Sun Microsystems,* pp. 1–181 (Mar. 1998).

"The Component Object Model: Technical Overview," Microsoft Corporation, pp. 1–17, available at www.microsoft.com/com/wpaper/Com_mod1.htm (1996).

Seetharaman, "The CORBA Connection," *Communications of the ACM 41:10,* pp. 34–36 (Oct. 1998).

Siegel, "OMG Overview: CORBA and the OMA in Enterprise Computing," *Communications of the ACM,* 41:10, pp. 37–43 (Oct. 1998).

Vinoski, "New Features for CORBA 3.0," *Communications of the ACM,* 41:10, pp. 44–52 (Oct. 1988).

Schmidt, "Evaluating Architectures for Multithreaded Object Request Brokers," *Communications of the ACM,* 41:10, pp. 54–60 (Oct. 1998).

Henning, "Binding, Migration, and Scalability in CORBA," *Communications of the ACM,* 41:10, pp. 62–71 (Oct. 1998).

Haggerty et al., "The benefits of CORBA–Based Network Management," *Communications of the ACM,* 41:10, pp. 73–79 (Oct. 1998).

Grimes, "Chapter 7: Security," *DCOM Programming: A guide to creating practical applications with Microsoft's Distributed Component Object Model,* pp. 319–389 (1997).

Schwartz, "Intel's middleware move: company ponders initiatives for common object services," *InfoWorld,* 20:9, p1(1), 2 pp. (Mar. 2, 1998).

Barkley, "Role Based Access Control (RBAC)," Software Diagnostics and Conformance Testing National Institute of Standards and Technology, 27 pp. (Mar. 1988).

Gavrila and Barkley, "Formal Specification for Role Based Access Control User/Role and Role/Role Relationship Management," 10 pp. (Oct. 1988).

Barkley, "Application Engineering in Health Care," pp. 1–7 (May 9, 1995).

Cugini and Ferraiolo, "Role Based Access Control Slide Set—May 1995," National Institute of Standards and Technology, 25 pp. (May 1995).

Ferraiolo and Barkley, "Specifying and Managing Role–Based Access Control within a Corporate Intranet," 6 pp. (1997).

Ferraiolo et al., "Role–Based Access Control (RBAC): Features and Motivations," 8 pp. (1995).

Kuhn, "Mutual Exclusion of Roles as a Means of Implementing Separation of Duty in Role–Based Access Control Systems," 8 pp. (1997).

Barkley, "Comparing Simple Based Access Control Models and Access Control Lists," 6 pp. (1997).

Barkley et al., "Role Based Access Control for the World Wide Web," 11 pp. (1997).

Ferraiolo and Kuhn, "Role–Based Access Control," Reprinted from Proceedings of $15^{th}$ National Computer Security Conference, 11 pp. (1992).

Barkley, "Implementing Role Based Access Control Using Object Technology," (1995).

Ferraiolo, "Role Based Access Control," NIST Web page, http://hissa.ncsl.nist.gov/rbac 2 pp., visited Jun. 1, 1999.

R. W. Baldwin, Naming and Grouping Privileges to Simplify Security Management in Large Databases. In Proceedings of the 1990 IEEE Symposium on Security and Privacy, pp. 116–132, May 1990.

Nyanchama, M., Osborn, S. (1994) Access Rights Administration in Role–Based Security Systems, Proc. IFIP WG 11.3 Database Security, 1994. In: Database Security VIII, Status and Prospects (J. Biskup, M. Morgenstern, C. E. Landwehr, Eds). North Holland (Elsevier), pp. 1–23.

Moffett J.D., Sloman M.S. & Twidle K.P. (1990), Specifying Discretionary Access Control Policy for Distributed Systems, Computer Communications, vol. 13, No. 9 (Nov. 1990) pp. 571–580.

U. S. National Institute of Standards and Technology. Federal information processing standards publication 140–1: Security requirements for cryptographic modules, Jan. 1994, pp. 1–53.

Jonathan D. Moffett. Specification of Management Policies and Discretionary Access Control. In M. S. Sloman, editor, Network and Distributed Systems Management, chapter 18, pp. 18–1 through 18–21, Addison–Wesley, 1994.

Sloman, M., and J. Moffett. "Managing Distributed Systems", Domino Project Report, Imperial College, U.K. Sep. 1989, pp. 1–23.

G. Wiederhold: Mediators in the Architecture of Future Information Systems. IEEE Computer, 25(3), 1992 (36 pages).

M.S. Sloman, Policy Driven Management for Distributed Systems. Journal of Network and Systems Management, 2(4): 333–360, Plenum Press Publishing, 1994 (22 pages in downloaded format).

Jonathan D. Moffett, Morris S. Sloman. Policy Hierarchies for Distributed Systems Management. IEEE Journal of Selected Areas in Communications, Special Issue on Network Management, 11(9):1404–1414, Dec. 1993 (22 pages in downloaded format).

Scott A. Gile. Reporting Application Usage in a LAN Environment, New Centerings in Computing Services, pp. 147–159 (1990).

Moffett J.D. & Sloman M.S. (1991b), The Representation of Policies as System Objects, Proceedings of the Conference on Organisational Computer Systems (COCS'91) Atlanta, GA, Nov. 5–8, 1991, in SIGOIS Bulletin vol. 12, Nos. 2 & 3, pp 171–184 (16 pages in downloaded format).

U.S. patent application Ser. No. 09/197,226, Hunt, filed Nov. 20, 1998.

U.S. patent application Ser. No. 09/135,397, Thatte et al., filed Aug. 17, 1998.

U.S. patent application Ser. No. 09/135,106, Al–Ghosien et al., filed Aug. 17, 1998.

U.S. patent application Ser. No. 09/197,080, Hunt, filed Nov. 20, 1998.

U.S. patent application Ser. No. 09/197,211, Hunt, filed Nov. 20, 1998.

U.S. patent application Ser. No. 09/196,836, Hunt, filed Nov. 20, 1998.

U.S. patent application Ser. No. 09/197,009, Hunt, filed Nov. 20, 1998.

U.S. patent application Ser. No. 09/197,246, Hunt, filed Nov. 20, 1998.

U.S. patent application Ser. No. 09/197,242, Hunt, filed Nov. 20, 1998.

U.S. patent application Ser. No. 09/196,974, Hunt, filed Nov. 20, 1998.

U.S. patent application Ser. No. 09/328,683, Williams et al., filed Jun. 08, 1999.

"Single–threaded Apartments," microsoft.com website, pp. 1–2, May 26, 1998.

"Using Secure RPC," MSDN Library CD, pp. 1–7, Apr. 1998.

"FAQ:COM Security Frequently Asked Questions," MSDN Library CD, pp. 1–10, Apr. 1998.

"Using DCOM Security," MSDN Library CD, pp. 1–5, Apr. 1998.

*Comparing Microsoft Transaction Server Enterprise JavaBeans: White Paper,* pp. 1–15, Jul. 1998.

Brown et al., "Distributed Component Object Model Protocol—DCOM/1.0," http://globecom.net/ietf/draft/draft–brown–dcom–v1–spec–03.html, pp. 1–52, Jan. 1998.

Asche, "Windows NT Security in Theory and Practice," Microsoft Developer Network CD, pp. 1–12, Jul. 1996.

"CoInitializeSecurity," Microsoft Developer Network CD, pp. 1–2, Jul. 1996.

"Security and Scalability," Microsoft Developer Network CD, p. 1, Jul. 1996.

"RPC_C_IMP_LEVEL_xxx," Microsoft Developer Network CD, p. 1, Jul. 1996.

"RPC_C_AUTHN_xxx," Microsoft Developer Network CD, p. 1, Jul. 1996.

"CoRegisterAuthenticationServices," Microsoft Developer Network CD, p. 1, Jul. 1996.

Bochenski, *IBM's SystemView,* Computer Technology Research Corp., pp. 1–27, 29–65, 67–79, 81–91, 93–103, 105–115, 117–139, 141–143, 1991.

Franklin, "Concurrency Control and Recovery," *The Computer Science and Engineering Handbook*, Tucker, Jr. (ed.), pp. 1058–1077, 1996.

*Java Remote Method Invocation*, http://java.sun.com/products/jdk/1.2/docs/guide/rmi/spec/rmiTOC.doc.html, pp. 1–3, Dec. 1997.

"Introduction," *Java Remote Method Invocation*, http://java.sun.com/products/jdk/1.2/docs/guide/rmi/spec/rmi–intro.doc.html, p.1, Dec. 1997.

"Overview," *Java Remote Method Invocation*, http://java.sun.com/products/jdk/1.2/docs/guide/rmi/spec/rmi–intro.doc1.html, p. 1, Dec. 1997.

"System Goals," *Java Remote Method Invocation*, http://java.sun.com/products/jdk/1.2/docs/guide/rmi/spec/rmi–intro.doc2.html, p. 1, Dec. 1997.

"Java Distributed Object Model," *Java Remote Method Invocation*, http://java.sun.com/products/jdk/1.2/docs/guide/rmi/spec/rmi–objmodel.doc.html, p. 1, Dec. 1997.

"Definition of Terms," *Java Remote Method Invocation*, http://java.sun.com/products/jdk/1.2/docs/guide/rmi/spec/rmi–objmodel.doc.html, p. 1, Dec. 1997.

"The Distributed and Nondistributed Models Contrasted," *Java Remote Method Invocation*, http://java.sun.com/products/jdk/1.2/docs/guide/rmi/spec/rmi–objmodel.doc2.html, p. 1, Dec. 1997.

"RMI Interfaces and Classes," *Java Remote Method Invocation*, http://java.sun.com/products/jdk/1.2/docs/guide/rmi–objmodel.doc3.html, pp. 1–2, Dec. 1997.

"Implementing a Remote Interface," *Java Remote Method Invocation*, http://java.sun.com/products/jdk/1.2/docs/guide/rmi/spec/rmi–objmodel.doc4.html, pp. 1–2, Dec. 1997.

"Type Equivalency of Remote Objects with Local Stub," *Java Remote Method Invocation*, http://java.sun.com/products/jdk/1.2/docs/guide/rmi/spec/rmi–objmodel.doc5.html, p. 1, Dec. 1997.

"Parameter Passing in Remote Method Invocation," *Java Remote Method Invocation*, http://java.sun.com/products/jdk/1.2/docs/guide/rmi/spec/rmi–objmodel.doc6.html, p. 1, Dec. 1997.

"Exception Handling in Remote Method Invocation," *Java Remote Method Invocation*, http://java.sun.com/products/jdk/1.2/docs/guide/rmi/spec/rmi–objmodel.doc7.html, p. 1, Dec. 1997.

"Object Methods Overridden by the RemoteObject Class," *Java Remote Method Invocation*, http://java.sun.com/products/jdk/1.2/docs/guide/rmi/spec/rmi–objmodel.doc8.html, pp. 1–2, Dec. 1997.

"The Semantics of Object Methods Declared Final," *Java Remote Method Invocation*, http://java.sun.com/products/jdk/1.2/docs/guide/rmi/spec/rmi–objmodel.doc9.html, p. 1, Dec. 1997.

"Locating Remote Objects," *Java Remote Method Invocation*, http://java.sun.com/products/jdk/1.2/docs/guide/rmi/spec/rmi–objmodel.doc10.html, p. 1, Dec. 1997.

"System Architecture," *Java Remote Method Invocation*, http://java.sun.com/products/jdk/1.2/docs/guide/rmi/spec/rmi–arch.doc.html, p. 1, Dec. 1997.

"Overview," *Java Remote Method Invocation*, http://java.sun.com/products/jdk/1.2/docs/guide/rmi/spec/rmi–arch.doc1.html, p. 1, Dec. 1997.

"Architectural Overview," *Java Remote Method Invocation*, http://java.sun.com/products/jdk/1.2/docs/guide/rmi/spec/rmi–arch.doc2.html, pp. 1–2, Dec. 1997.

"The Stub/Skeleton Layer," *Java Remote Method Invocation*, http://java.sun.com/products/jdk/1.2/docs/guide/rmi/spec/rmi–arch.doc3.html, p. 1, Dec. 1997.

"The Remote Reference Layer," *Java Remote Method Invocation*, http://java.sun.com/products/jdk/1.2/docs/guide/rmi/spec/rmi–arch.doc4.html, p. 1, Dec. 1997.

"The Transport Layer," *Java Remote Method Invocation*, http://java.sun.com/products/jdk/1.2/docs/guide/rmi/spec/rmi–arch.doc5.html, pp. 1–2, Dec. 1997.

"Thread Usage in Remote Method Invocations," *Java Remote Method Invocation*, http://java.sun.com/products/jdk/1.2/docs/guide/rmi/spec/rmi–arch.doc6.html, p. 1, Dec. 1997.

"Garbage Collection of Remote Objects," *Java Remote Method Invocation*, http://java.sun.com/products/jdk/1.2/docs/guide/rmi/spec/rmi–arch.doc7.html, pp. 1–2, Dec. 1997.

"Dynamic Class Loading," *Java Remote Method Invocation*, http://java.sun.com/products/jdk/1.2/docs/guide/rmi/spec/rmi–arch.doc8.html, pp. 1–4, Dec. 1997.

"Security," *Java Remote Method Invocation*, http://java.sun.com/products/jdk/1.2/docs/guide/rmi/spec/rmi–arch.doc9.html, pp. 1–2, Dec. 1997.

"Configuration Scenarios," *Java Remote Method Invocation*, http://java.sun.com/products/jdk/1.2/docs/guide/rmi/spec/rmi–arch.doc10.html, pp. 1–2, Dec. 1997.

"RMI Through Firewalls Via Proxies," *Java Remote Method Invocation*, http://java.sun.com/products/jdk/1.2/docs/guide/rmi/spec/rmi–arch.doc11.html, pp. 1–3, Dec. 1997.

"Client Interfaces," *Java Remote Method Invocation*, http://java.sun.com/products/jdk/1.2/docs/guide/rmi/spec/rmi–client.doc.html, p. 1, Dec. 1997.

"The Remote Interface," *Java Remote Method Invocation*, http://java.sun.com/products/jdk/1.2/docs/guide/rmi/spec/rmi–client.doc1.html, p. 1, Dec. 1997.

"The RemoteException Class," *Java Remote Method Invocation*, http://java.sun.com/products/jdk/1.2/docs/guide/rmi/spec/rmi–client.doc2.html, p. 1, Dec. 1997.

"The Naming Class," *Java Remote Method Invocation*, http://java.sun.com/products/jdk/1.2/docs/guide/rmi/spec/rmi–client.doc3.html, pp. 1–2, Dec. 1997.

"Server Interfaces," *Java Remote Method Invocation*, http://java.sun.com/products/jdk/1.2/docs/guide/rmi/spec/rmi–server.doc.html, p. 1, Dec. 1997.

"The RemoteObject Class," *Java Remote Method Invocation*, http://java.sun.com/products/jdk/1.2/docs/guide/rmi/spec/rmi–server.doc.html, pp. 1–2, Dec. 1997.

"The RemoteServer Class," *Java Remote Method Invocation*, http://java.sun.com/products/jdk/1.2/docs/guide/rmi/spec/rmi–server.doc2.html, pp. 1–2, Dec. 1997.

"The SocketType Class," *Java Remote Method Invocation*, http://java.sun.com/products/jdk/1.2/docs/guide/rmi/spec/rmi–server.doc3.html, pp. 1–4, Dec. 1997.

"The UnicastRemoteObject Class," *Java Remote Method Invocation*, http://java.sun.com/products/jdk/1.2/docs/guide/rmi/spec/rmi–server.doc4.html, pp. 1–3, Dec. 1997.

"The Unreferenced Interface," *Java Remote Method Invocation*, http://java.sun.com/products/jdk/1.2/docs/guide/rmi/spec/rmi–server.doc5.html, p. 1, Dec. 1997.

"The RMISecurityManager Class," *Java Remote Method Invocation*, http://java.sun.com/products/jdk/1.2/docs/guide/rmi/spec/rmi–server.doc6.html, pp. 1–5, Dec. 1997.

"The RMIClassLoader Class," *Java Remote Method Invocation*, http://java.sun.com/products/jdk/1.2/docs/guide/rmi/spec/rmi–server.doc7.html, pp. 1–2, Dec. 1997.

"The LoaderHandler Interface," *Java Remote Method Invocation*, http://java.sun.com/products/jdk/1.2/docs/guide/rmi/spec/rmi–server.doc8.html, p. 1, Dec. 1997.

"The RMISocketFactory Class," *Java Remote Method Invocation*, http://java.sun.com/products/jdk/1.2/docs/guide/rmi/spec/rmi–server.doc9.html, pp. 1–2, Dec. 1997.

"The RMIFailureHandler Interface," *Java Remote Method Invocation*, http://java.sun.com/products/jdk/1.2/docs/guide/rmi/spec/rmi–server.doc10.html, p. 1, Dec. 1997.

"The LogStream Class," *Java Remote Method Invocation*, http:java.sun.com/products/jdk/1.2/docs/guide/rmi/spec/rmi–server.doc11.html, pp. 1–2, Dec. 1997.

"Stub and Skeleton Compiler," *Java Remote Method Invocation*, http://java.sun.com/products/jdk/1.2/docs/guide/rmi/spec/rmi–server.doc12.html, p. 1, Dec. 1997.

"Registry Interfaces," *Java Remote Method Invocation*, http://java.sun.com/products/jdk/1.2/docs/guide/rmi/spec/rmi–registry.doc.html, p. 1, Dec. 1997.

"The Registry Interface," *Java Remote Method Invocation*, http://java.sun.com/products/jdk/1.2/docs/guide/rmi/spec/rmi–registry.doc1.html, pp. 1–2, Dec. 1997.

"The LocateRegistry Class," *Java Remote Method Invocation*, http://java.sun.com/products/jdk/1.2/docs/guide/rmi/spec/rmi–registry.doc2.html, pp. 1–2, Dec. 1997.

"The RegistryHandler Interface," *Java Remote Method Invocation*, http://java.sun.com/products/jdk/1.2/docs/guide/rmi/spec/rmi–registry.doc3.html, p. 1, Dec. 1997.

"Remote Object Activation," *Java Remote Method Invocation*, http://java.sun.com/products/jdk/1.2/docs/guide/rmi/spec/rmi–activation.doc.html, p. 1, Dec. 1997.

"Overview," *Java Remote Method Invocation*, http://java.sun.com/products/jdk/1.2/docs/guide/rmi/spec/rmi–activation.doc1.html, pp. 1–2, Dec. 1997.

"Activation Protocol," *Java Remote Method Invocation*, http://java.sun.com/products/jdk/1.2/docs/guide/rmi/spec/rmi–activation.doc2.html, pp. 1–2, Dec. 1997.

"Implementation Model for an "Activatable" Remote Object," *Java Remote Method Invocation*, http://java.sun.com/products/jdk/1.2/docs/guide/rmi/spec/rmi–activation.doc3.html, pp. 1–12, Dec. 1997.

"Activation Interfaces," *Java Remote Method Invocation*, http://java.sun.com/products/jdk/1.2/docs/guide/rmi/spec/rmi–activation.doc4.html, pp. 1–14, Dec. 1997.

"Stub/Skeleton Interfaces," *Java Remote Method Invocation*, http://java.sun.com/products/jdk/1.2/docs/guide/rmi/spec/rmi–stubs.doc.html, p. 1, Dec. 1997.

"The RemoteStub Class," *Java Remote Method Invocation*, http://java.sun.com/products/jdk/1.2/docs/guide/rmi/spec/rmi–stubs.doc1.html, p. 1, Dec. 1997.

"The RemoteCall Interface," *Java Remote Method Invocation*, http://java.sun.com/products/jdk/1.2/docs/guide/rmi/spec/rmi–stubs.doc2.html, pp. 1–2, Dec. 1997.

"The RemoteRef Interface," *Java Remote Method Invocation*, http://java.sun.com/products/jdk/1.2/docs/guide/rmi/spec/rmi–stubs.doc3.html, pp. 1–2, Dec. 1997.

"The ServerRef Interface," *Java Remote Method Invocation*, http://java.sun.com/products/jdk/1.2/docs/guide/rmi/spec/rmi–stubs.doc4.html, p. 1, Dec. 1997.

"The Skeleton Interface," *Java Remote Method Invocation*, http://java.sun.com/products/jdk/1.2/docs/guide/rmi/spec/rmi–stubs.doc5.html, p. 1, Dec. 1997.

"The Operation Class" *Java Remote Method Invocation*, http://java.sun.com/products/jdk/1.2/docs/guide/rmi/spec/rmi–stubs.doc6.html, p. 1, Dec. 1997.

"Garbage Collector Interfaces," *Java Remote Method Invocation*, http://java.sun.com/products/ jdk/1.2/docs/guide/rmi/spec/rmi–dgc.doc.html, p. 1, Dec. 1997.

"The Interface DGC," *Java Remote Method Invocation*, http://java.sun.com/products/jdk/1.2/docs/guide/rmi/spec/rmi–dgc.doc1.html, pp. 1–2, Dec. 1997.

"The Lease Class," *Java Remote Method Invocation*, http://java.sun.com/products/jdk/1.2/guide/rmi/spec/rmi–dgc.doc2.html, p. 1, Dec. 1997.

"The ObjID Class," *Java Remote Method Invocation*, http://java.sun.com/products/jdk/1.2/docs/guide/rmi/spec/rmi–dgc.doc3.html, pp. 1–2, Dec. 1997.

"The UID Class," *Java Remote Method Invocation*, http://java.sun.com/products/jdk/1.2/docs/guide/rmi/spec/rmi–dgc.doc4.html, pp. 1–2, Dec. 1997.

"VMID Class," *Java Remote Method Invocation*, http://java.sun.com/products/jdk/1.2/docs/guide/rmi/spec/rmi–dgc.doc5.html, pp. 1–2, Dec. 1997.

"RMI Wire Protocol," *Java Remote Method Invocation*, http://java.sun.com/products/jdk/1.2/docs/guide/rmi/spec/rmi–protocol.doc.html, p. 1, Dec. 1997.

"Overview," *Java Remote Method Invocation*, http://java.sun.com/products/jdk/1.2/docs/guide/rmi/spec/rmi–protocol.doc1.html, p. 1, Dec. 1997.

"RMI Transport Protocol," *Java Remote Method Invocation*, http://java.sun.com/products/jdk/1.2/docs/guide/rmi/spec/rmi–protocol.doc2.html, pp. 1–3, Dec. 1997.

"RMI's Use of Object Serialization Protocol," *Java Remote Method Invocation*, http://java.sun.com/products/jdk/1.2/docs/guide/rmi/spec/rmi–protocol.doc3.html, pp. 1–2, Dec. 1997.

"RMI's Use of HTTP POST Protocol," *Java Remote Method Invocation*, http://java.sun.com/products/jdk/1.2/docs/guide/rmi/spec/rmi–protocol.doc4.html, p. 1, Dec. 1997.

"Application Specific Values for RMI," *Java Remote Method Invocation*, http://java.sun.com/products/jdk/1.2/docs/guide/rmi/spec/rmi–protocol.doc5.html, p. 1, Dec. 1997.

"RMI's Multiplexing Protocol," *Java Remote Method Invocation*, http://java.sun.com/products/jdk/1.2/docs/guide/rmi/spec/rmi–protocol.doc6.html, pp. 1–6, Dec. 1997.

"Exceptions During Remote Object Export," *Java Remote Method Invocation*, http://java.sun.com/products/jdk/1.2/docs/guide/rmi/spec/rmi–exceptions.doc1.html, pp. 1–2, Dec. 1997.

"Exceptions During RMI Call," *Java Remote Method Invocation*, http://java.sun.com/products/jdk/1.2/docs/guide/rmi/spec/rmi–exceptions.doc2.html, p. 1, Dec. 1997.

"Possible Causes of java.rmi.ServerException," *Java Remote Method Invocation*, http://java.sun.com/products/jdk/1.2/docs/guide/rmi/spec/rmi–exceptions.doc4.html, p. 1, Dec. 1997.

"Naming Exceptions," *Java Remote Method Invocation*, http://java.sun.com/products/jdk/1.2/docs/guide/rmi/spec/rmi–exceptions.doc5.html, p. 1, Dec. 1997.

"Other Exceptions," *Java Remote Method Invocation*, http://java.sun.com/products/jdk/1.2/docs/guide/rmi/spec/rmi–exceptions.doc6.html, p. 1, Dec. 1997.

"Properties in RMI," *Java Remote Method Invocation*, http://java.sun.com/products/jdk/1.2/docs/guide/rmi/spec/rmi–properties.doc.html, p. 1, Dec. 1997.

"Server Properties," *Java Remote Method Invocation*, http://java.sun.com/products/jdk/1.2/docs/guide/rmi/spec/rmi–properties.doc1.html, p. 1, Dec. 1997.

"Activation Properties," *Java Remote Method Invocation*, http://java.sun.com/products/jdk/1.2/docs/guide/rmi/spec/rmi–properties.doc2.html, p. 1, Dec. 1997.

"Other Properties," *Java Remote Method Invocation*, http://java.sun.com/products/jdk/1.2/docs/guide/rmi/spec/rmi–properties.doc3.html, p. 1, Dec. 1997.

Kiczales, *Aspect–Oriented–Programming*, http://www.parc.xerox.com/spl/projects/aop/invited–talk, 86 pp. 1997.

Mens et al., "Aspect–Oriented Programming Workshop Report," *Proceedings of the Aspect–Oriented Programming Workshop at ECOOP '97*, 14 pp., 1997.

Aksit, "Issues in Aspect–Oriented Software Development," *Proceedings of the Aspect–Oriented Programming Workshop at ECOOP '97*, 7 pp., 1997.

Czarnecki et al., "Beyond Objects: Generative Programming," *Proceedings of the Aspect–Oriented Programming Workshop at ECOOP '97*, 8 pp., 1997.

De Meuter, "Monads as a Theoretical Foundation for AOP," *Proceedings of the Aspect–Oriented Programming Workshop at ECOOP '97*, 6 pp., 1997.

Dempsey et al., "*Aspects* of System Support for Distributed Computing," *Proceedings of the Aspect–Oriented Programming Workshop at ECOOP '97*, 6 pp., 1997.

Hernández et al., "Coordinating Concurrent Objects: How to Deal with the Coordination Aspect?," *Proceedings of the Aspect–Oriented Programming Workshop at ECOOP '97*, 6 pp., 1997.

Holmes et al., "Aspects of Synchronisation," *Proceedings of the Aspect–Oriented Programming Workshop at ECOOP '97*, 6 pp., 1997.

Lamping, "The Interaction of Components and Aspects," *Proceedings of the Aspect–Oriented Programming Workshop at ECOOP '97*, 1 pp., 1997.

Matthijs et al., "Aspects Should Not Die," *Proceedings of the Aspect–Oriented Programming Workshop at ECOOP '97*, 5 pp., 1997.

Müller, "draft: Aspect–Design in the Building–Block Method," *Proceedings of the Aspect–Oriented Programming Workshop at ECOOP '97*, 3 pp., 1997.

Harrison et al., "The Beginnings of a Graphical Environment for Subject–Oriented Programming," *Proceedings of the Aspect–Oriented Programming Workshop at ECOOP '97*, 2 pp., 1997.

Thorup, "Contextual Class Extensions," *Proceedings of the Aspect–Oriented Programming Workshop at ECOOP '97*, 7 pp., 1997.

VanHilst, "Subcomponent Decomposition as a Form of Aspect Oriented Programming," *Proceedings of the Aspect–Oriented Programming Workshop at ECOOP '97*, 2 pp., 1997.

Van Roy et al., "Using Mobility to Make Transparent Distribution Practical," *Proceedings of the Aspect–Oriented Programming Workshop at ECOOP '97*, 18 pp., 1997.

Werner, "Email Thoughts," *Proceedings of the Aspect–Oriented Programming Workshop at ECOOP '97*, 1 pp., 1997.

Aksit et al., "Solving the Modeling Problems of Object–Oriented Languages by Composing Multiple Aspects Using Composition Filters," *Proceedings of the Aspect–Oriented Programming Workshop at ECOOP '98*, 7 pp., 1998.

Bardou, "Roles, Subjects and Aspects: How Do They Relate?," *Proceedings of the Aspect–Oriented Programming Workshop at ECOOP '98*, 7 pp., 1998.

Becker, "$D^2AL$," *Proceedings of the Aspect–Oriented Programming Workshop at ECOOP '98*, 7 pp., 1998.

Berger et al., "Interactions Between Objects: An Aspect of Object–Oriented Languages," *Proceedings of the Aspect–Oriented Programming Workshop at ECOOP '98*, 6 pp., 1998.

Blair et al., "The Impact of Aspect–Oriented Programming on Formal Methods," *Proceedings of the Aspect–Oriented Programming Workshop at ECOOP '98*, 6 pp., 1998.

Blank et al., "Aspects of Enterprise Java Beans," *Proceedings of the Aspect–Oriented Programming Workshop at ECOOP '98*, 4 pp., 1998.

Böllert, "Aspect–Oriented Programming Case Study: System Management Application," *Proceedings of the Aspect–Oriented Programming Workshop at ECOOP '98*, 4 pp., 1998.

Buhr, "A Possible Design Notation for Aspect Oriented Programming," *Proceedings of the Aspect–Oriented Programming Workshop at ECOOP '98*, 11 pp., 1998.

Fabry, "Replication as an Aspect," *Proceedings of the Aspect–Oriented Programming Workshop at ECOOP '98*, 6 pp., 1998.

Fradet et al., "AOP: Towards a Generic Framework Using Program Transformation and Analysis," *Proceedings of the Aspect–Oriented Programming Workshop at ECOOP '98*, 6 pp., 1998.

Hauck et al., *AspectIX*: A Middleware for Aspect–Oriented Programming, *Proceedings of the Aspect–Oriented Programming Workshop at ECOOP '98*, 5 pp., 1998.

Holmes et al., "Towards Reusable Synchronisation for Object–Oriented Languages," *Proceedings of the Aspect–Oriented Programming Workshop at ECOOP '98*, 10 pp., 1998.

Kendall, "Agent Roles and Aspects," *Proceedings of the Aspect–Oriented Programming Workshop at ECOOP '98*, 7 pp., 1998.

Lopes et al., "Recent Developments on AspectJ™," *Proceedings of the Aspect–Oriented Programming Workshop at ECOOP '98*, 4 pp., 1998.

Lorenz et al., "Visitor Beans: An Aspect–Oriented Pattern," *Proceedings of the Aspect–Oriented Programming Workshop at ECOOP '98*, 8 pp., 1998.

Lunau, "Is Composition of Metaobjects = Aspect–Oriented Programming," *Proceedings of the Aspect–Oriented Programming Workshop at ECOOP '98*, 4 pp., 1998.

Kenens et al., "An AOP Case with Static and Dynamic Aspects," *Proceedings of the Aspect–Oriented Programming Workshop at ECOOP '98*, 6 pp., 1998.

Nebbe, "Coordination and Composition: *The Two Paradigms Underlying AOP?,*" *Proceedings of the Aspect–Oriented Programming Workshop at ECOOP '98*, 5 pp., 1998.

Ossher et al., "Operation–Level Composition: A Case in (Join) Point," *Proceedings of the Aspect–Oriented Programming Workshop at ECOOP '98*, 4 pp., 1998.

Sánchez et al., "Run–Time Adaptability of Synchronization Policies in Concurrent Object–Oriented Languages," *Proceedings of the Aspect–Oriented Programming Workshop at ECOOP '98*, 10 pp., 1998.

Tekinerdogan et al., "Deriving Design Aspects from Canonical Models," *Proceedings of the Aspect–Oriented Programming Workshop at ECOOP '98*, 7 pp., 1998.

Walker et al., "Assessing Aspect–Oriented Programming and Design: Preliminary Results," *Proceedings of the Aspect–Oriented Programming Workshop at ECOOP '98*, 6 pp., 1998.

Volder, "Aspect–Oriented Logic Meta Programming," *Proceedings of the Aspect–Oriented Programming Workshop at ECOOP '98*, 6 pp., 1998.

Sessions, "Sharing and Scalability," *COM and DCOM*, pp. 249–313, 1998.

Sessions, "Clustering," *COM and DCOM*, pp. 413–442, 1998.

Hamilton (ed.), "Events," *JavaBeans*, Sun Microsystems, pp. 24–39, 1996.

Black, "Scheduling Support for Concurrency and Parallelism in the Mach Operating System," *Computer*, pp. 35–43, May 1990.

King, "The Base System," *Inside Windows 95*, Microsoft Press, pp. 103–150, 1994.

Abadi et al., *A Calculus for Access Control in Distributed Systems*, Digital Equipment Corporation, pp. 1–44, 1991.

Abadi et al., *Baby Modula–3 and a Theory of Objects*, Digital Equipment Corporation, pp. 1–36, 1993.

Birrell et al., *Synchronization Primitives for a Multiprocessor: A Formal Specification*, SRC Research Report 20, pp. 1–20, 1987.

Birrell, *An Introduction to Programming with Threads*, Digital Equipment Corporation, pp. 1–33, 1989.

Burstall et al., *A Kernel Language for Modules and Abstract Data Types*, Digital Equipment Corporation, pp. 1–51, 1984.

Cardelli, *A Polymorphic $\lambda$–calculus with Type: Type*, Digital Equipment Corporation, pp. 1–27, 1986.

Cardelli et al., *Modula–3 Report (revised)*, Digital Equipment Corporation, pp. 1–61, 63, 65–71, and Appendix (*Twelve Changes to Modula–3, Dec. 19, 1990* pp. 1–15), 1989.

DeTreville, *Experience with Concurrent Garbage Collectors for Modula–2+*, Digital Equipment Corporation, pp. 1–58, 1990.

Ellis et al., *Real–time Concurrent Collection on Stock Multiprocessors*, Digital Equipment Corporation, pp. 1–25, 1988.

Horning et al., *Some Useful Modula–3 Interfaces*, Digital Equipment Corporation, pp. 1–103, 1993.

Lamport, *A Fast Mutual Exclusion Algorithm*, Digital Equipment Corporation, pp. 1–12, 1988.

Lamport, *A Simple Approach to Specifying Concurrent Systems*, Digital Equipment Corporation, pp. 1–39, 1986, 1988.

Lamport, *Concurrent Reading and Writing of Clocks*, Digital Equipment Corporation, pp. 1–7, 1988.

Lamport, *How to Make a Correct Multiprocess Program Execute Correctly on a Multiprocessor*, Digital Equipment Corporation, pp. 1–10. 1993.

Lamport, *On Interprocess Communication*, Digital Equipment Corporation, pp. 1–50, 1985.

Lamport, *win and sin: Predicate Transformers for Currency*, Digital Equipment Corporation, pp. 1–43, 1988.

McJones et al., *Evolving the UNIX System Interface to Support Multithreaded Programs*, Digital Equipment Corporation, pp. 1–80, 1987.

Nelson, *A Generalization of Dijkstra's Calculus*, Digital Equipment Corporation, pp. 1–56, 1986.

Owicki, *Experience with the Firefly Multiprocessor Workstation*, Digital Equipment Corporation, pp. 1–15, 17–20, 1989.

Roberts et al., *WorkCrews: An Abstraction for Controlling Parallelism*, Digital Equipment Corporation, pp. 1–15, 17–19, 1989.

Rovner et al., *On Extending Modula–2 For Building Large, Integrated Systems*, Digital Equipment Corporation, pp. 1–45, 1985.

Schroeder et al., *Performance of Firefly RPC*, Digital Equipment Corporation, pp. 1–15, 1989.

Thacker et al., *Firefly: A Multiprocessor Workstation*, Digital Equipment Corporation pp. 1–13, 15 and 17–18, 1987.

Bruce, "The Treatment of State in Optimistic Systems," *IEEE*, pp. 40–49, Jun. 1995.

"CORBA Overview," *The Common Object Request Broker: Architecture and Specification*, Revision 2.0, pp. 2–1 through 2–17, Jul. 1995.

*The Common Object Request Broker: Architecture and Specification*, Revision 2.0, pp. 4–12 through 4–16, Jul. 1995.

Jajodia, "Database Security and Privacy," *The Computer Science and Engineering Handbook*, Tucker (ed.), CRC Press, pp. 1112–1124, 1997.

Sandhu et al., "Authentication, Access Control, and Intrusion Detection," *The Computer Science and Engineering Handbook*, Tucker (ed.), CRC Press, pp. 1929–1948, 1997.

Orfali et al., "Client/Server Tranaction Processing," *Essential Client/Server Survival Guide*, pp. 241–288, 1994.

Steinman, "Incremental State Saving in Speedes Using C++," *Proceedings of the 1993 Winter Simulation Conference*, pp. 687–696, 1993.

Limprecht, "Microsoft Transaction Server," *Compcon '97, Proceedings, IEEE*, pp. 14–18, Feb. 1997.

Wills, "Process Synchronization and Interprocess Communication,"*The Computer Science and Engineering Handbook*, Tucker (ed.), CRC Press, pp. 1725–1746, 1997.

*Object Transaction Service*, OMG Document 94.6.1, pp. 1–102, 1994.

Chappell, "The Microsoft Transaction Server (MTS): Transactions Meet Components," http://www.microsoft.com/Com/wpaper/mtscomp.asp, pp. 1–17, 1997.

Davis, "Inside IBM's System View," *Datamation*, vol. 37, No. 4, pp. 62–65, Feb. 15, 1991.

Bowen, "Intel's Middleware Move," *InfoWorld*, pp. 1–2, 1998.

Broy, *Can Fair Choice be Added to Dijkstra's Calculus?*, Digital Equipment Corporation, pp. 1–19, 1989.

COMPOSABLE ROLES

TECHNICAL FIELD

The present invention relates to providing security for object-based computer software applications, and more particularly relates to limiting access privileges to a set of computer user identities.

BACKGROUND OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers at a bank, and sales at a retail business. In these examples, the processing services provided by the server application may update databases of class schedules, hotel reservations, account balances, product shipments, payments, or inventory for actions initiated by the individual users at their respective stations.

In a server application that is used by a large number of people, it is often useful to discriminate between what different users and groups of users are able to do with the server application. For example, in an on-line bookstore server application that provides processing services for entering book orders, order cancellations, and book returns, it may serve a useful business purpose to allow any user (e.g., sales clerks or customers) to access book order entry processing services, but only some users to access order cancellation processing services (e.g., a bookstore manager) or book return processing services (e.g., returns department staff).

Network operating systems on which server applications are typically run provide sophisticated security features, such as for controlling which users can logon to use a computer system, or have permission to access particular resources of the computer system (e.g., files, system services, devices, etc.) In the Microsoft Windows NT operating system, for example, each user is assigned a user id, which has an associated password. A system administrator also can assign sets of users to user groups, and designate which users and user groups are permitted access to system objects that represent computer resources, such as files, folders, and devices. During a logon procedure, the user is required to enter the user id along with its associated password to gain access to the computer system. When the user launches a program, the Windows NT operating system associates the user id with the process in which the program is run and with the process' threads. When a thread executing on the user's behalf then accesses a system resource, the Windows NT operating system performs an authorization check to verify that the user id associated with the thread has permission to access the resource. (See, Custer, *Inside Windows NT* 22, 55–57, 74–81 and 321–326 (Microsoft Press 1993).)

A thread is the basic entity to which the operating system allocates processing time on the computer's central processing unit. A thread can execute any part of an application's code, including a part currently being executed by another thread. Threads of a process share the virtual address space, global variables, and operating-system resources of the process. (See, e.g., Tucker Jr., Allen B. (editor), *The Computer Science and Engineering Handbook* 1662–1665 (CRC Press 1997).)

Object Oriented Applications

In object oriented programming, programs are written as a collection of object classes which each model real world or abstract items by combining data to represent the item's properties with methods (e.g., program functions or procedures) to represent the item's functionality. More specifically, an object is an instance of a programmer-defined type referred to as a class, which exhibits the characteristics of data encapsulation, polymorphism and inheritance.

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related methods of the object. In other words, the client programs do not access the object's data directly, but must instead call methods on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

A problem facing developers of object oriented applications is finding a way to implement a security scheme efficiently. For example, a developer of a banking application may want to prevent tellers from accessing an object for changing a customer's deposit balance. However, the developer may be designing an application for use by a wide variety of banking organizations with different organizational structures and different employees. It would be a burdensome task for the application developer to customize the banking application for each of the banking organizations. Further, if user identities specific to the banking organization were placed in the objects' logic, maintaining the application would require the further burden of changing the logic to account for employee turnover or reorganization.

Roles

A product addressing the problem of specifying access privileges to objects is provided by an application execution environment called Microsoft Transaction Server, a product separate from Windows NT which provides runtime services to application components.

Microsoft Transaction Server provides a mechanism called roles for defining an application's security. Using roles, the application developer can specify a logical class of users (i.e., the role) permitted to access processing services of an application. The roles are independent of the system on which the application will be deployed. Subsequently, when the application is deployed on a host computer system, the deploying computer user (e.g., a security administrator) populates each role with particular users and groups. The roles are bound to the users and groups. In this way, the application developer can define security for the application without regard to what users and groups are recognized by the host computer system, and the administrator can tailor the security definition for a particular definition.

For example, a developer might put together a banking application by defining two roles: managers and tellers. In the application, the developer grants the managers role access privileges to components performing manager-related tasks; the tellers role is granted access privileges to components performing teller-related tasks. When the banking application is deployed, the administrator populates the managers and tellers roles with particular users and groups recognized by the host computer system (e.g., "gsmith" and "team1"). Microsoft Transaction Server binds the users and groups to the application roles.

At runtime, Microsoft Transaction Server compares the identity of a user attempting to access an object with those bound to the object. Users not bound to the role granted privileges for the object are not permitted access to the object. Roles thus provide a developer with an efficient way to control access to application objects.

Composing Object Oriented Applications

An advantage of object oriented programming is the ability to incorporate logic for a particular set of related functions into a single software component. Consequently, software developers can build an application by assembling a set of software components, reusing proven software components without having to reexamine their logic. The ability to reuse software components (sometimes called "reusability") leads to more efficient application development.

Sometimes, however, a single application does not perform all the functions desired by an organization. For example, a bookstore may purchase a first application for its shipping department to track customer shipments and returns. Meanwhile, the accounts payable division of the accounting department may require a second application with specialized functions to handle electronic payment to the book suppliers. The two applications may be combined (or "composed") into an overall application, exchanging data among the software components.

For example, the shipping application can provide information about shipped orders and returns to the inventory application, to determine when to order more books or when to pay book suppliers. When two or more applications are combined into one overall application, the overall application is sometimes called an "extended application," and the degree to which multiple applications can be combined into an extended application is sometimes called "composability."

Maintaining security in an extended application poses certain challenges. Specifically, certain security problems arise when applications with roles are composed into an extended application.

For example, one application developer may have chosen "managers" for a role name, and another application developer may have instead used "mgr." Although the roles may be conceptually equivalent, their titles are slightly different. At deployment time, the administrator ends up populating each role with the same users, unnecessarily duplicating work. Further, whenever a change in the organization requires a change to the role membership, the administrator must change both the "managers" and the "mgr" role, again leading to unnecessary work and possible confusion.

On the other hand, a developer might choose a title for a role that is already defined for another application. For example, one application developer may title a role for managers as "teamA" and another application developer may title a role for tellers as "teamA." At deployment time, the administrator may confuse the two roles, which likely should be populated by different users and groups.

Further, an organization might deploy two applications with roles originally not thought to have a relationship. For example, a business application having the roles "managers" and "engineers" might be composed with a team management application having the roles "coaches" and "players." If the "engineers" role and the "players" role are filled by the same users and groups, again work is unnecessarily duplicated.

Finally, an organization might implement a scheme in which one set of users performs functions for two roles defined in a single application. For example, the shipping department might also handle customer returns. In an application in which "shippers" and "returns staff" roles are defined, the administrator would again have to populate the roles with the same users and groups and maintain the two roles separately.

Although roles such as those in Microsoft Transaction Server provide a way to define security independent of a particular computer system, they do not address the above scenarios in an efficient way.

SUMMARY OF THE INVENTION

The present invention includes a method and system for composing roles. An administrator can associate a first role with a second role, which takes on the population of the first role. Subsequent changes to the first role's population are automatically implemented to the second role's population. More than two roles can be associated, and the roles may be from the same or different applications. As a result, an administrator can perform one operation to bind a user to multiple roles.

In one aspect of the invention, the roles are bound to composite roles. The binding can be one to one, many to one, or one to many. The composite roles are populated with users, and users populating a composite role are considered to be members of the roles bound to the composite role. In this way, an administrator can populate a single composite role instead of individually populating separate application roles.

In another aspect of the invention, a security administrator can specify one role follows another role; the followed role becomes a composite role. Users added to a role are also added to any roles following it.

In another aspect of the invention, an application with new roles is installed on a computer system already having defined roles. The administrator can select which new roles, if any, should be composed with roles already on the computer system.

In still another aspect of the invention, a security framework is provided for implementing roles. The security framework consults a central store of security settings, including role definitions, to determine whether access to a component's functionality is permitted. The framework blocks calls to objects if access is not permitted. The framework provides security logic outside the objects, so a developer is freed from having to develop security logic for the objects or within the objects. However, the framework provides programmatic access to role information so a developer can implement a custom security scheme with logic in the objects, if desired.

Additional features and advantages of the invention will be made apparent from the following detailed description of illustrated embodiments, which proceeds with reference to the accompanying drawings.

DETAILED DESCRIPTION OF THE INVENTION

The present invention is directed toward a method and system for providing an object execution environment with a security framework providing automatic security services for composable applications. In one embodiment illustrated herein, the invention is incorporated into an object services component entitled "COM+" of an operating system entitled "Microsoft Windows NT Server 5.0," both marketed by Microsoft Corporation of Redmond, Wash. Briefly described, this software is a scaleable, high-performance network and computer operating system supporting distributed client/server computing, and providing an object execution environment for object applications conforming to COM. The COM+ component incorporates object services from prior object systems, including Microsoft Component Object Model (COM), Microsoft Distributed Component Object Model (DCOM), and Microsoft Transaction Server (MTS).

Exemplary Operating Environment

Figure 1:
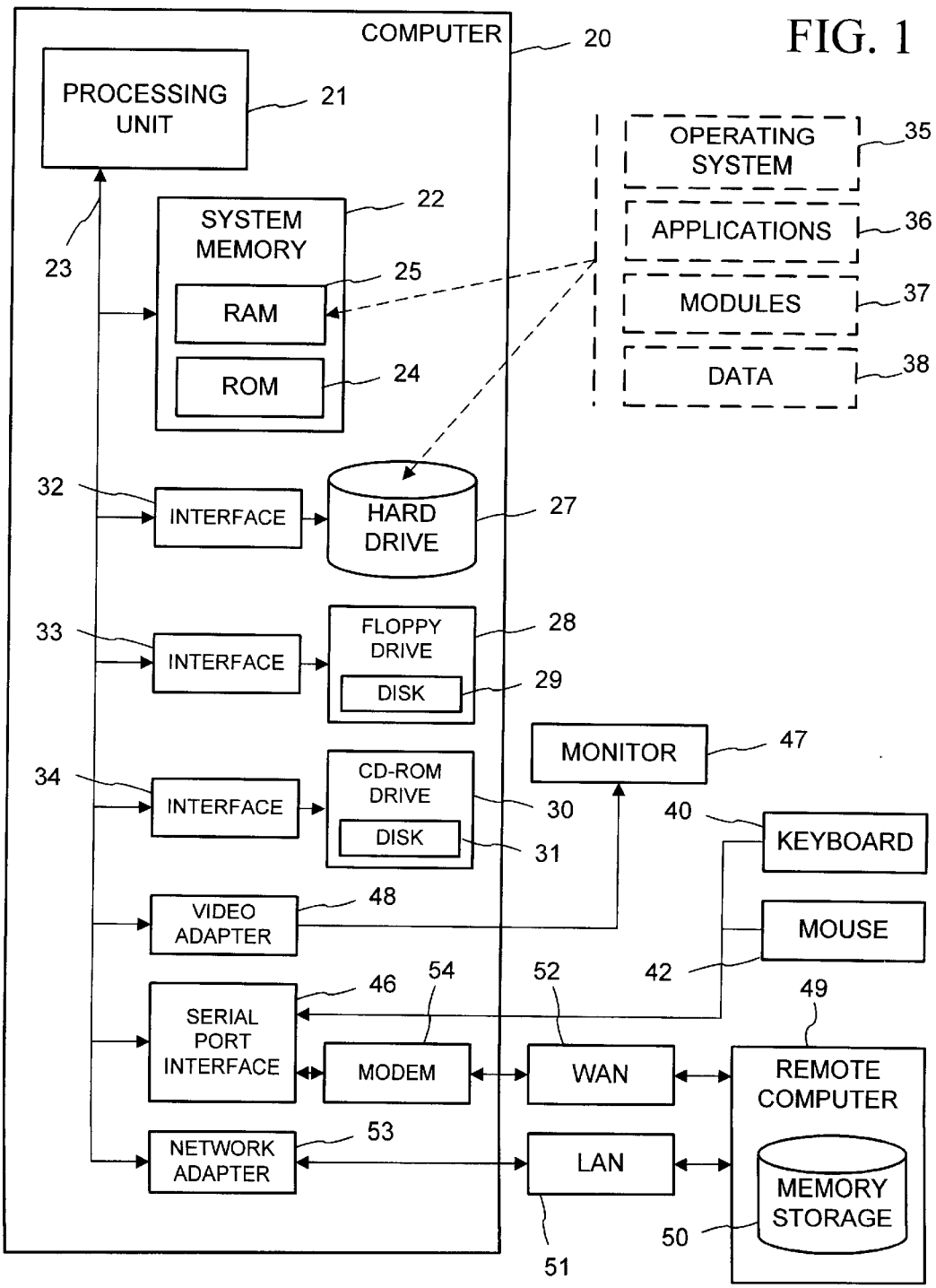
FIG. 1 is a block diagram of a computer system that may be used to implement the described security framework for programming objects.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, objects (also called components), data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated computer is the Microsoft Windows NT Server operating system, together with the before mentioned Microsoft Transaction Server.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview of Objects

Figure 2:
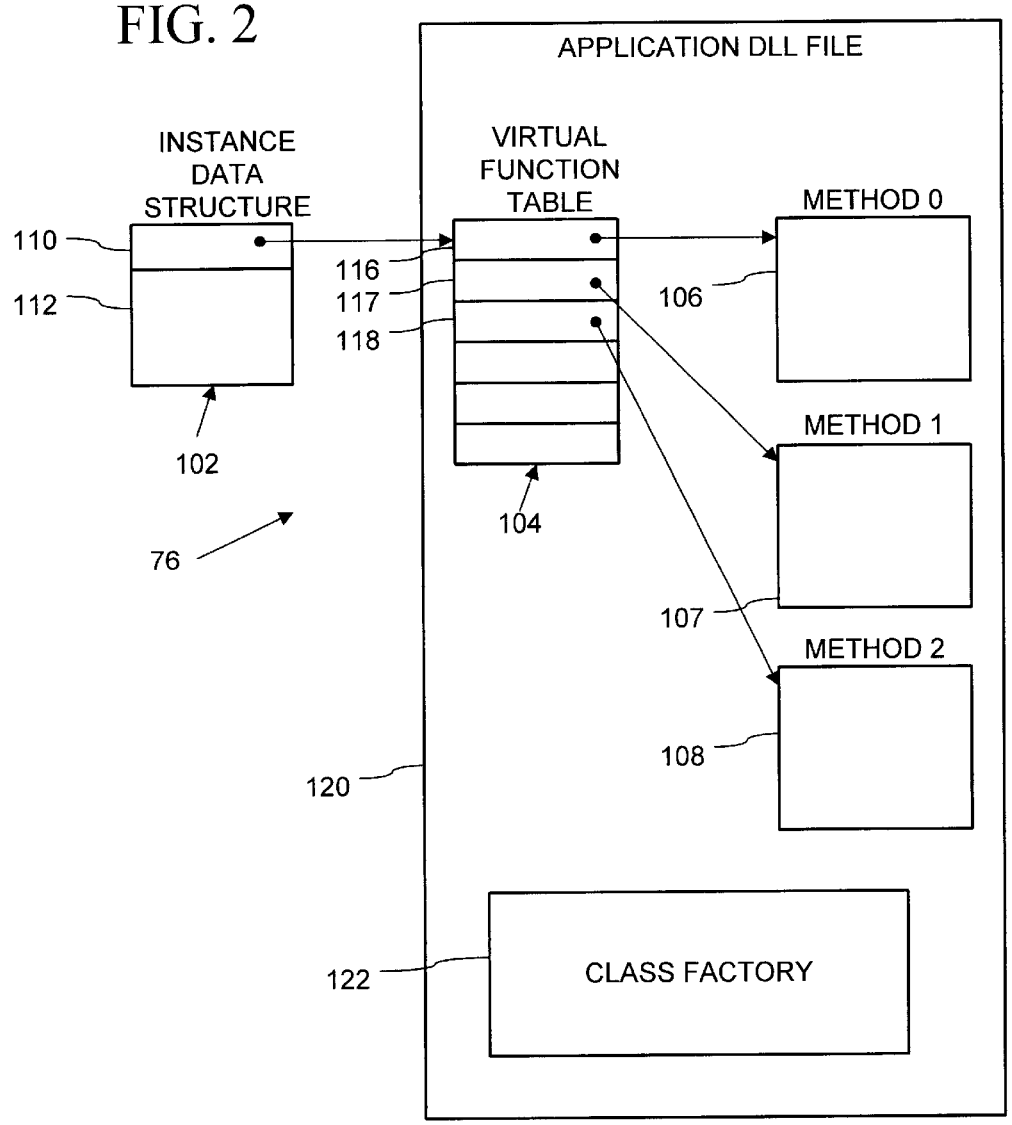
FIG. 2 is a block diagram of an object conforming to the Component Object Model specification of Microsoft Corporation, which may be used to construct objects for use with the described security framework.

FIG. 2 and the following discussion are intended to provide an overview of programming objects, using the Microsoft Component Object Model (COM) as an exemplary object model. In the illustrated embodiments, the security framework is implemented in an extension to the Microsoft COM Environment termed "COM+." COM is a model for accommodating programming objects and can be implemented on a variety of platforms, such as the Microsoft Windows NT operating system. In the illustrated embodiments of the invention, the application objects conform to the Microsoft Component Object Model ("COM") specification (i.e., are implemented as a "COM Object" 76) and are executed using the COM+ services of the Microsoft Windows NT Server 5.0 operating system, but alternatively may be implemented according to other object standards (including the CORBA (Common Object Request Broker Architecture) specification of the Object Management Group, and JavaBeans by Sun Microsystems) and executed under object services of another operating system. The COM specification defines binary standards for objects and their interfaces which facilitate the integration of software objects into applications. (For a detailed discussion of COM and OLE, see Kraig Brockschmidt, *Inside OLE, Second Edition*, Microsoft Press, Redmond, Wash. (1995)).

Application developers compose an application by designing a set of application objects (also called "application components") to implement the business logic of the application; each application object contains program code for a portion of the application's work. For example, a banking application may comprise a transfer object, a debit account object, and a credit account object which perform parts of the work of a money transfer operation in the application.

With reference now to FIG. 2, in accordance with COM, the application object 76 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the object). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the application object 76. By convention, the interfaces of a COM object are illustrated graphically as a plug-in jack as shown for the application object 206 in FIG. 3. Also, interfaces conventionally are given names beginning with a capital "I." In accordance with COM, the application object 76 can include multiple interfaces which are implemented with one or more virtual function tables. The member function of an interface is denoted as "IInterfaceName-::FunctionName."

The virtual function table 104 and member functions 106–108 of the application object 76 are provided by an application program 120 (hereafter "server application DLL") which is stored in the computer on which the object is installed as a dynamic link library file (denoted with a ".dll" file name extension). In accordance with COM, the server application DLL 120 includes code for the virtual function table 104 and member functions 106–108 of the classes that it supports, and also includes a class factory 122 that generates the instance data structure 102 for an object of the class.

Illustrated Embodiments

In the illustrated embodiments, composable roles are shown in an exemplary security framework limiting access privileges according to role definitions as described in more detail below. The security framework transparently provides various security services to objects according to security settings declared at development time and deployment time, relieving application developers from having to incorporate security logic in application objects. However, composable roles can be implemented in environments with alternative security arrangements, including ones in which objects programmatically determine whether a user is in a particular role.

Overview of an Implementation of Composable Roles

A role is a logical class of users having access privileges to processing services of an application. An application role is a role defined by a developer at development time of the application to define access privileges to processing services to the application. A composite role is a role bound to at least one role. Various elements in the arrangement may be bound to other elements. For example, a composite role may be bound to an application role. A binding is a mechanism for indicating one element is associated with another and can be achieved in a number of ways (e.g., using a pointer to an element, or placing elements in a table).

In the following example, a composite role is bound to an application role and bound to at least one user; however, an alternative embodiment could use further levels of indirection (e.g., an intermediate composite role bound to a composite role).

Figure 3:
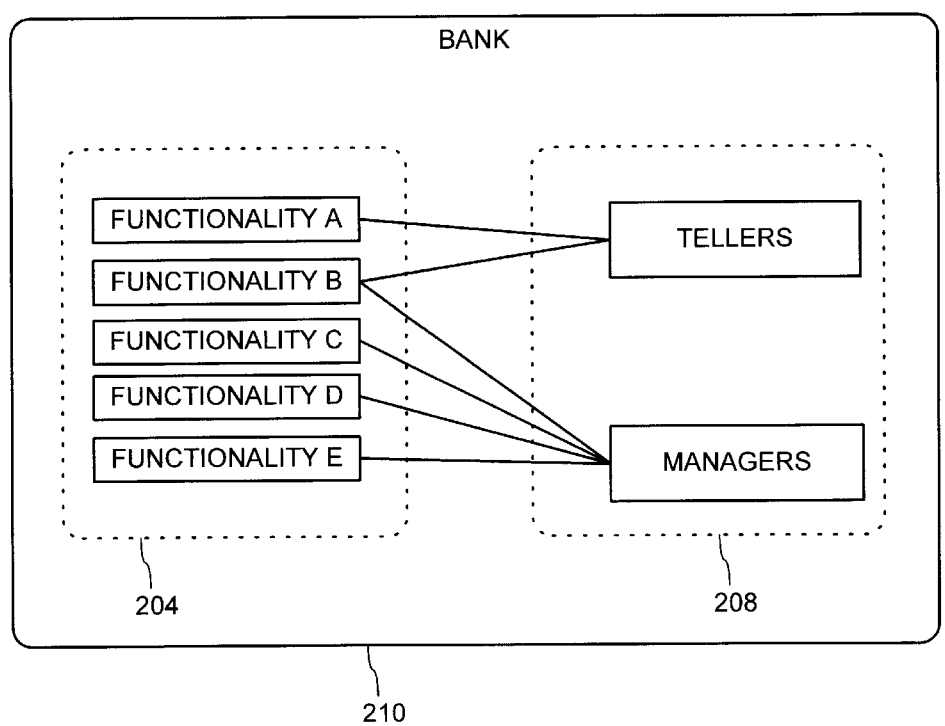
FIG. 3 is a block diagram of roles associated with a set of processing services to define access privileges of the roles.

With reference now to FIG. 3, access privileges to various processing services 204 of an application "Bank" 210 are defined at development time for the roles "tellers" and "managers". The application developer can specify which roles 208 have access privileges to the functionality of the application declaratively using a graphical user interface or by including declarations in the application's source code.

For example, functionality B might be an object method for changing a customer's address. In FIG. 3, a user in either the "managers" role or the "tellers" role can change a customer's address using the object method. At development time, the roles 208 are not associated with any particular users, so the application can be developed independently from computers on which it is eventually installed. Since the "tellers" role and the "managers" role are associated with a particular application and are defined at development of the application they are sometimes called "application roles."

Figure 4:
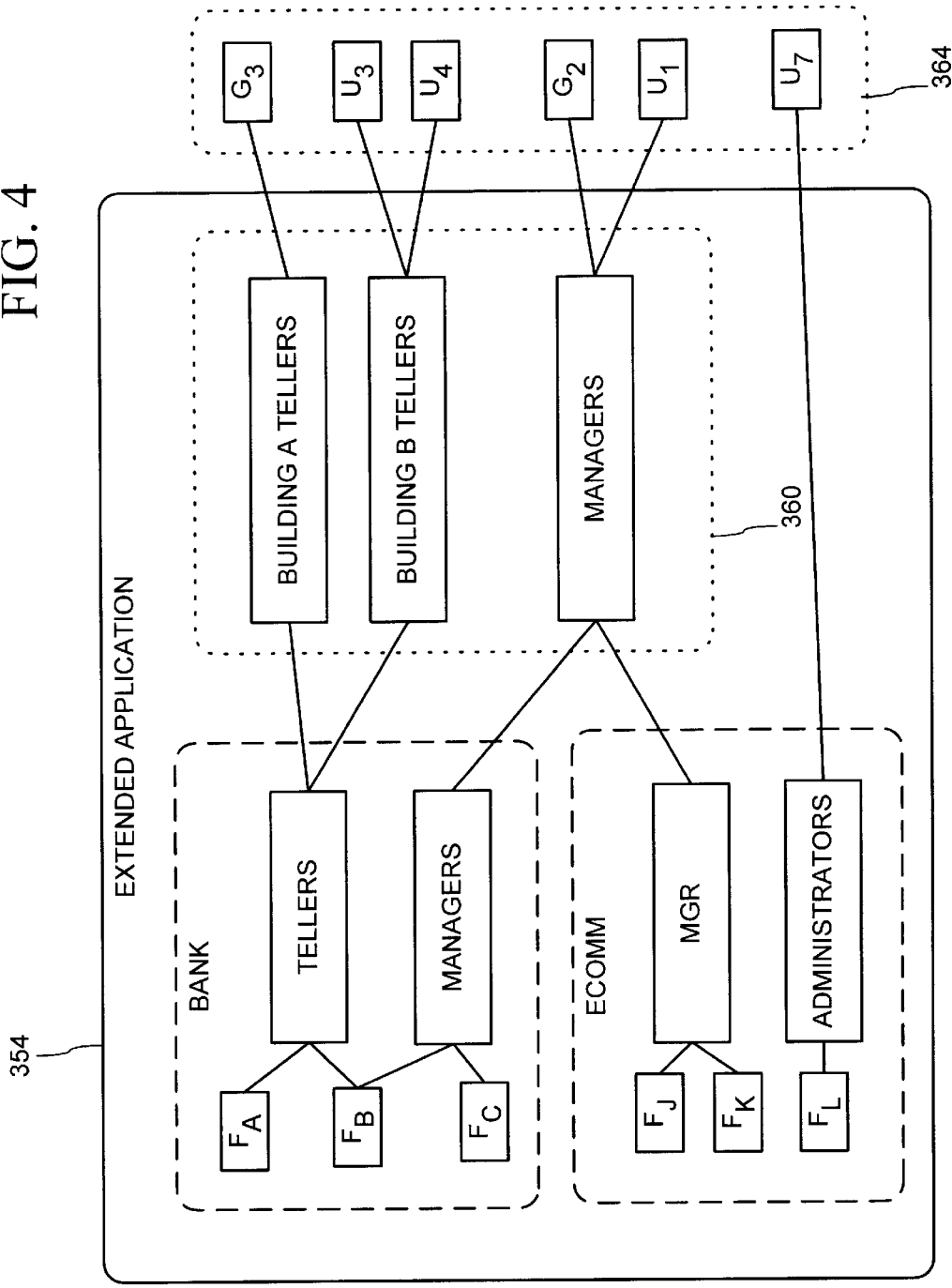
FIG. 4 is a block diagram of roles associated with composite roles to bind plural roles to a single set of users and groups.

When multiple applications are installed on a single computer system (e.g., a server computer providing functionality to a set of users at client computers or terminals), the application combination is sometimes called an "extended application." FIG. 4 shows an arrangement in which roles are used in an extended application.

To facilitate population of the application roles in the extended application 354, a set of composite roles 360 is provided. The composite roles 360 can be populated with users and groups 364 using a graphical user interface as described below. In some cases, the composite roles 360 may be in a simple one-to-one association with the application roles; however, FIG. 4 shows an arrangement in which one-to-many and many-to-one associations are present.

For example, the managers composite role is bound to both the "managers" and "mgr" application roles. Accordingly, when the "managers" composite role is populated with users and groups, those users are considered members of the "managers" and "mgr" application roles for security purposes. Thus, a security administrator can add users to multiple roles with a single operation.

Also, the example shows two composite roles "building A tellers" and "building B tellers" associated with the application role "tellers." Such an arrangement might be useful if, for example, the tellers in building A are permitted to also perform certain manager functions, but the tellers in building B are not. In the example, users and groups bound to either (or both) of the two composite roles are considered members of the tellers application role.

At runtime, the security framework determines whether a particular user has access privileges to particular functionality. Typically, a function call is provided to determine whether a user is in a specified application role (e.g., "Is User1 in the Mgr role?"). The determination is made by evaluating the relationships between the application roles, the composite roles, and the users bound to (i.e., populating) the composite roles.

In FIG. 4, if a user or group is bound to a composite role that is bound in turn to an application role, the user or group has access privileges for functionality linked to the application role. Various variations on the arrangement are possible while still retaining composability of roles. For example, additional "intermediary" roles could be placed between the application roles and the composite roles. Also, as explained below, an application role can serve as a composite role when another role follows the application role. Finally, it is possible for an application role to be bound to both a composite role and users (or groups). In such an arrangement, the members of the application role are those users bound to the application role as well as the users bound to the composite role that is bound to application role.

Exemplary User Interface for Implementing Composable Roles

The interface presented for manipulating roles (e.g., by a developer or security administrator) in the illustrated embodiments is the COM+ Explorer. The COM+ Explorer is illustrated as an enhanced version of the Object Explorer provided in the Microsoft Transaction Server. The COM+ Explorer supports both application roles and composite roles. At development time, an application developer can use the COM+ Explorer to declaratively specify access privileges for roles at the object, interface, and method level.

Using the COM+ Explorer, a user can manipulate three properties for roles: a name, a description, and a role id. The name of a role is a text string identifying the logical class of users. For example, roles in an on-line banking application may be assigned the names, "customer," "junior teller," "senior teller," "branch manager," "vice president," and "president," to identify the respective logical classes of users represented by the roles. The description property is a text field describing the logical class of users or the purpose of the role to aid in administration and management of the roles, such as where roles having identical names are used in different applications deployed on a same server computer. The role id is a globally unique identifier (GUID) chosen when the role is created. The role id can be used to differentiate roles even if the same name is used in different applications. Roles typically are associated with a particular application; however, the COM+ Explorer also supports composite roles, which are not limited to a particular application.

The various settings manipulated with the COM+ Object Explorer are kept in a central store called the catalog. Subsequently, when a developer wishes to prepare a particular application for distribution, the developer selects an export option, which allows the developer to export either a client version (to be run remotely from a server) or a server version (to accommodate remote client versions) of the application. These versions are also sometimes called "packages." The export option generates a catalog appropriate for the package; at deployment time, the catalog is imported into the computer onto which the package is deployed.

Figure 5:
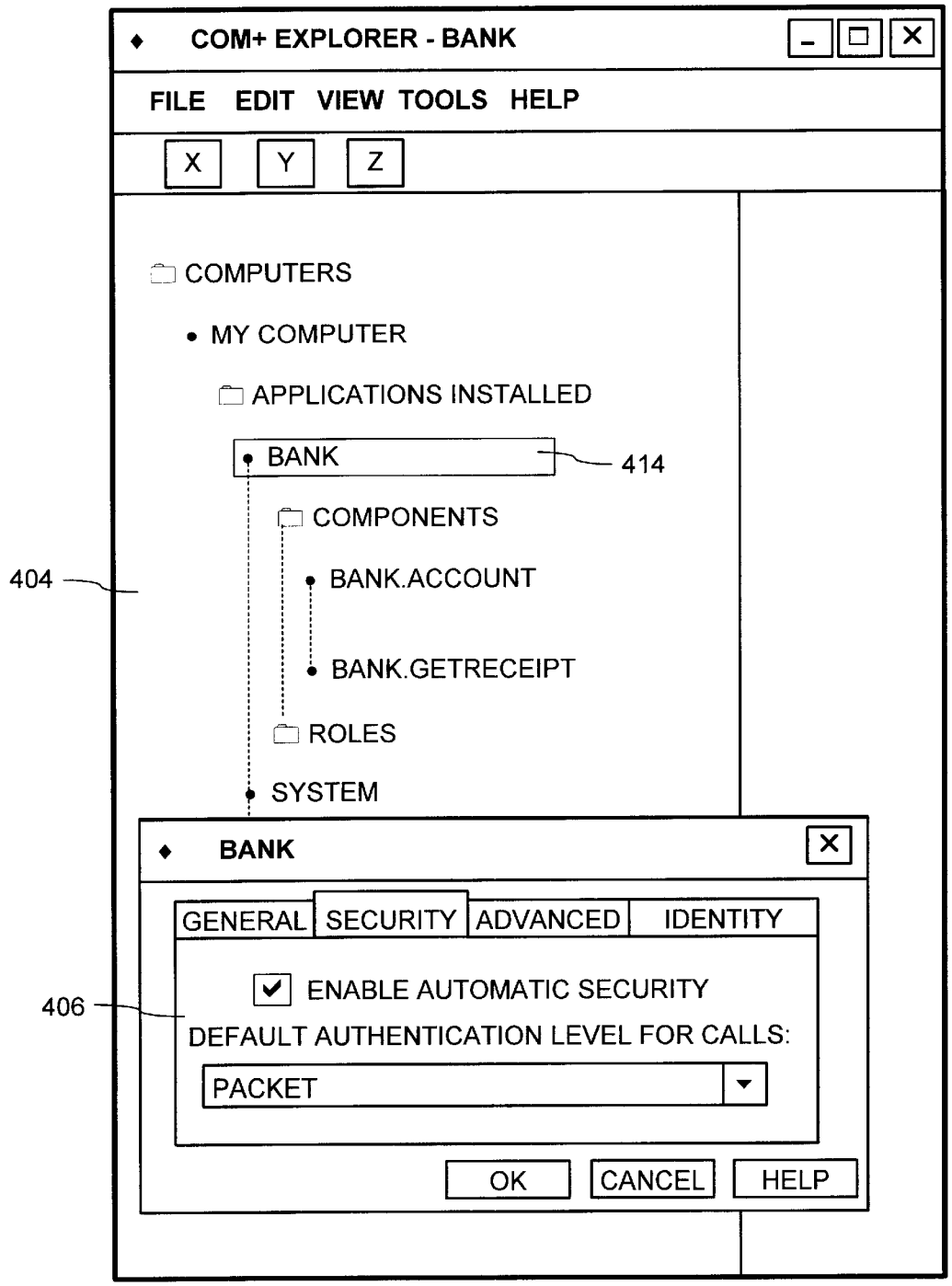
FIG. 5 is a view of a graphical user interface of an administration utility called the COM+ Object Explorer, for declaring various security requirements for objects.

When the application is deployed on a host computer, the deploying user uses the COM+ Explorer to populate application roles with users and groups. Roles can also be populated with a composite role. When the composite role is populated with users (or groups), those users are to be members of any roles populated with (i.e., bound to) the composite role. Subsequently, at runtime, access checks are done with reference to the application roles and composite roles, if any. PATENT Defining Roles at Development Time A view of the COM+ Object Explorer presented during application development is shown in FIG. 5. A user (e.g., an application developer) is presented with a window 400 with a pane 404 showing a highlighted label 414 for the application "bank." The window 406 allows a user to enable automatic security by checking the appropriate checkbox.

Selecting the automatic security checkbox as shown in FIG. 5 results in a catalog entry indicating automatic security for components of the application. Subsequently, when an instance of one of the application's components is instantiated, automatic security is arranged by a security activator; activators are described in more detail below. The user can also set an authentication level (e.g., "packet") for the application using a pick list. Authentication levels are described in more detail below.

Figure 6:
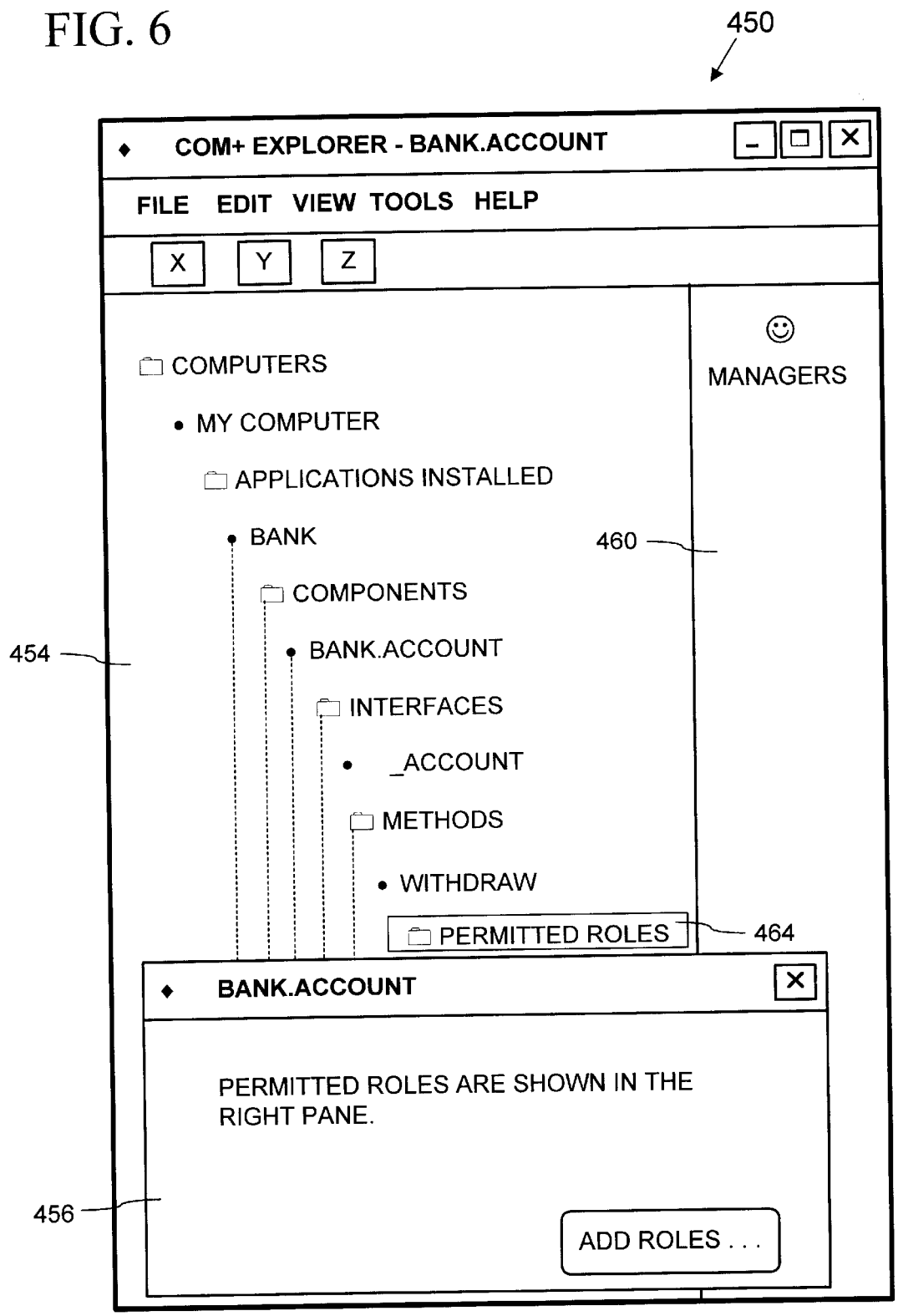
FIG. 6 is a view of a feature of the COM+ Object Explorer interface for showing roles permitted to access an object's method.

With reference now to FIG. 6, a window 450 shows roles having access to a particular method in the bank application for an object called "account." The "permitted roles" label 464 is highlighted in the pane 454 to indicate the roles permitted to call the "withdraw" method of the "account" object are shown in the pane 460. To add roles, the user activates the "Add Roles" button in window 456, resulting in the view of FIG. 7.

Figure 7:
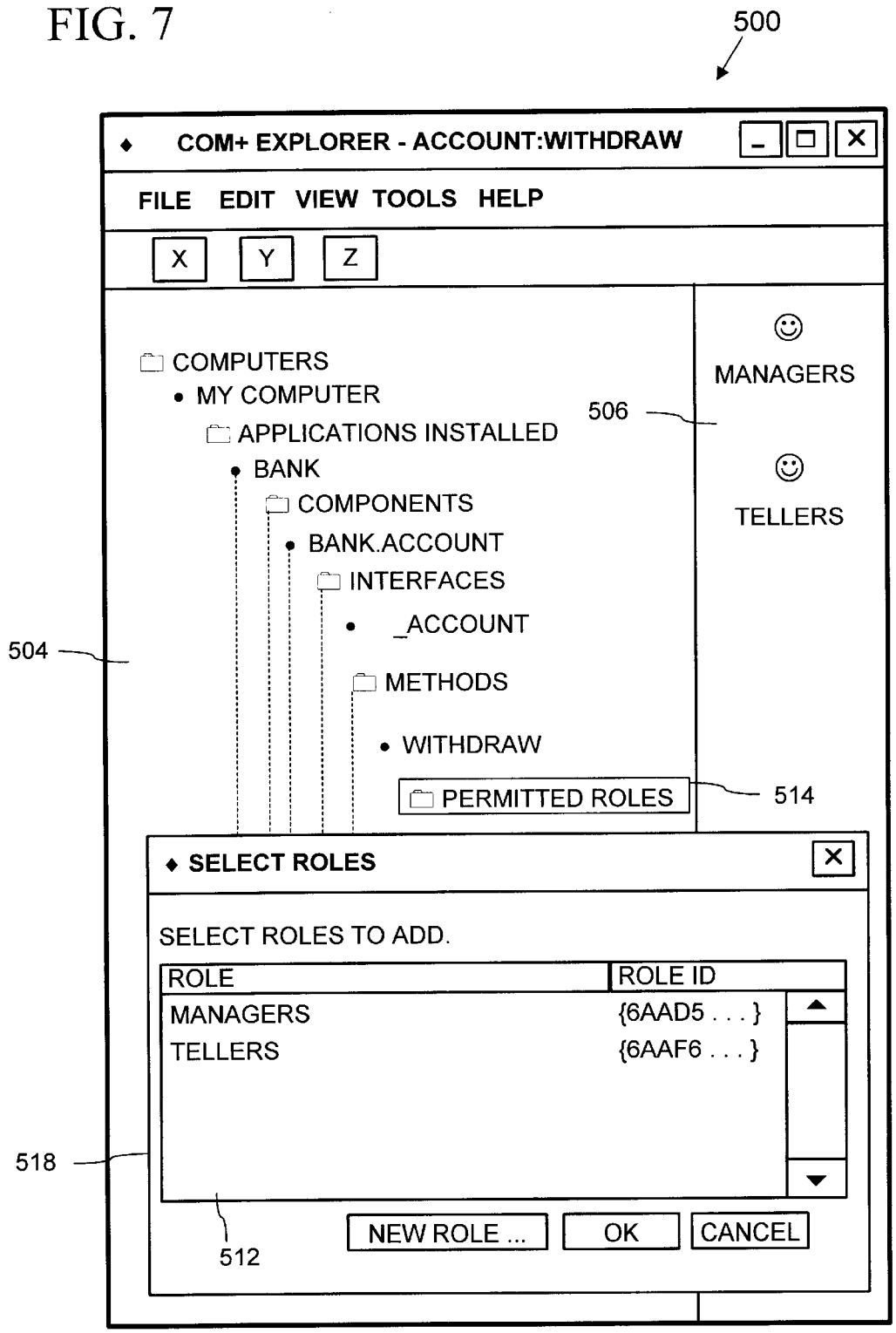
FIG. 7 is a view of a feature of the COM+ Object Explorer interface for adding roles to those permitted to access an object's method.

The window 500 of FIG. 7 shows a user (e.g., an application developer) has added a role to those having access privileges to the "withdraw" method of an interface to the object "account." The window 518 shows the various roles 512 from which the user can select to add to the permitted roles. In the pane 504, the "permitted roles" label 514 for the method "withdraw" is highlighted, indicating the various roles permitted to call the method are shown in the pane 506. After the user has added the "tellers" role, the "managers" and "tellers" roles are permitted to call the method. In the illustrated embodiment, a single authentication level is associated for roles in an application; however, an alternative embodiment could allow a user to specify a different authentication level for each role. Although the example shows controlling access at the method level, a user can also control access at the object, interface, and application level by selecting an appropriate line in the interface. Roles specified at a higher (e.g., the component) level apply to lower (e.g., interface and method) levels unless explicitly specified otherwise.

An alternative way to declaratively define security in the framework is to include various declaration lines in the object's source code. The declarations are scanned at compile time to assemble access control settings instead of or in addition to using the COM+ Object Explorer. Subsequent changes can be made and rescanned without having to recompile the objects. An example of such declaration lines follows:

TABLE 1

```
[ RoleAccess = "managers,tellers" ]
Interface IsecureFunctions
{
    [ RoleAccess = "managers" ]
        double SetBalance
            ([in] long lAccount, [in] double dAmount);
//no RoleAccess attribute implies no method-level check
        double GetBalance
            ([in] long lAccount, [out] double *pdAmount);
}
[ RoleAccess = "manager, tellers, temps" ]
coclass Bank : public ISecureFunctions, IOpenFunctions
{
    public:
        //function declarations - business logic
}
```

Populating Roles at Deployment Time

Figure 8:
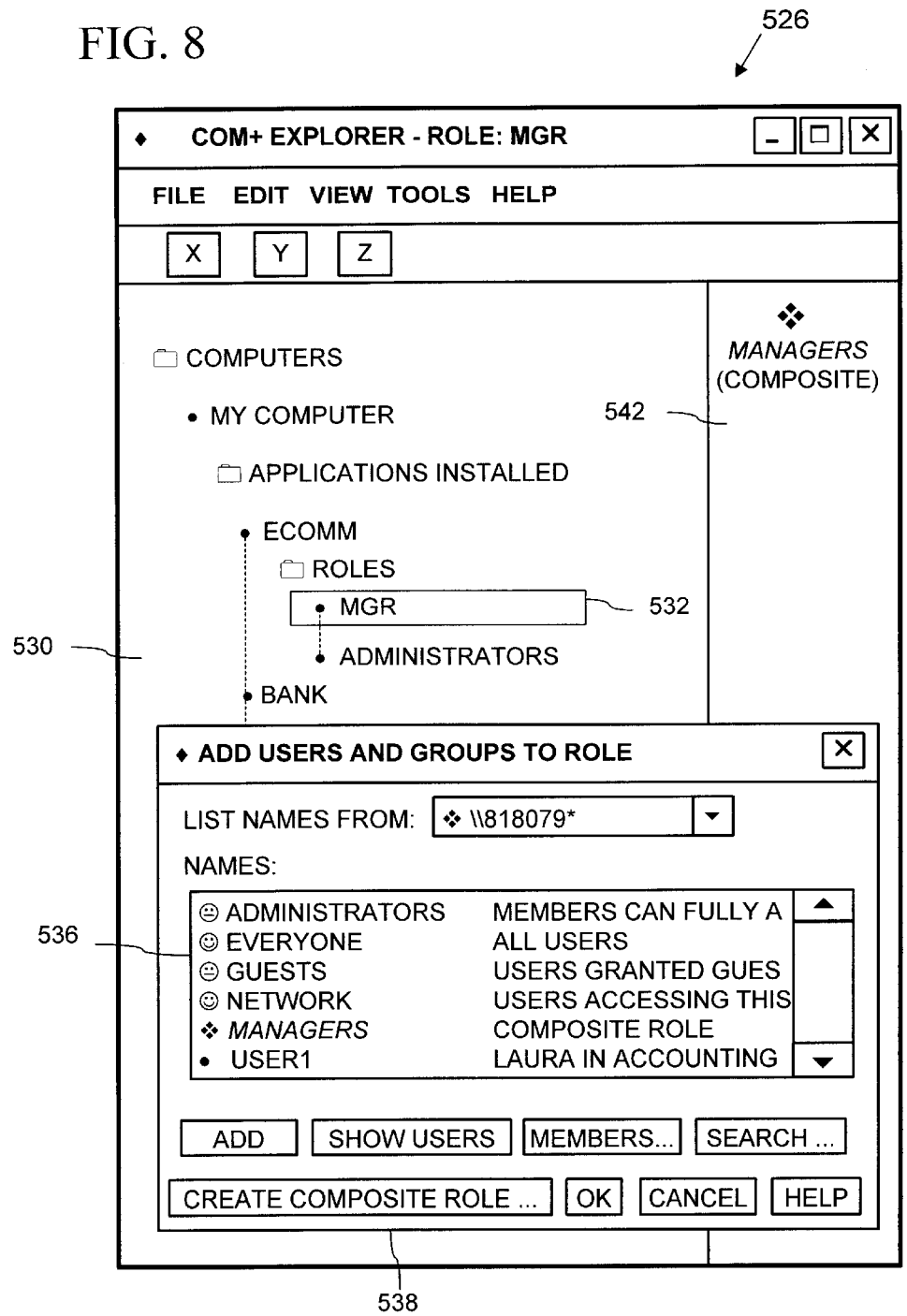
FIG. 8 is a view of a feature of the COM+ Object Explorer interface for populating a role with a composite role when an application is deployed on a host computer system.

When the application is deployed, the deploying user is presented with an interface as shown in FIG. 8. The window 526 includes a pane 530, which has a highlighted line for the "mgr" role 532. The deploying user can add various users and groups to the role by selecting from the list 536 shown in the window 538.

The pane 542 shows the current users and groups bound to the role "mgr." In the example, the role composite role "Managers" is shown as in the "mgr" role; it could also be in other roles (e.g., the "Managers" role for the application "Bank"). When users and groups are added to the composite role (e.g., using the interface shown in FIG. 8), the users and groups are considered members of any roles bound to the composite role (e.g., "Mgr" in "Ecomm" and "Managers" in "Bank").

Figure 9:
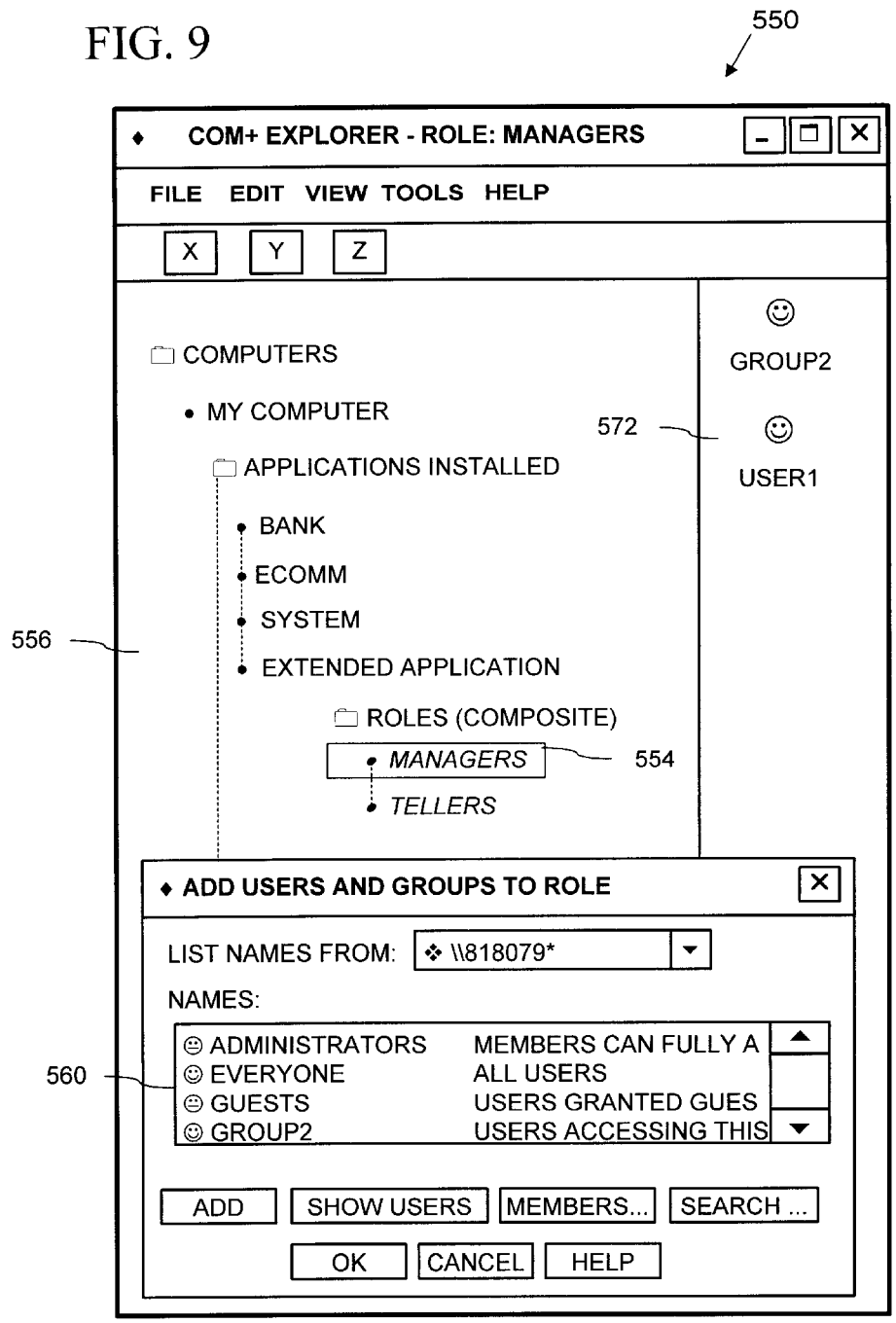
FIG. 9 is a view of a feature of the COM+ Object Explorer interface for populating a composite role with users and groups when an application is deployed on a host computer system.

For example, FIG. 9 shows a window 550 in which a user has selected the "Managers" line 554 for the composite role "Managers" in the pane 556. The user populates the composite role "Managers" by selecting users and groups from the list 560. For purposes of the example, both the "Mgr" role of the application "Ecomm" and the "Managers" role of the application "Bank" are bound to the composite role "Managers." As a result, adding "Group2" and "User1" to the composite role "Managers" (as shown in pane 572) results in "Group2" and "User1" considered as members of both the "Mgr" application role and the "Managers" application role. In this way, a user can add (or delete) a user (or group) to multiple roles with a single operation. Also, a user or group can be removed from a role's membership by selecting the appropriate icon in the pane 572 and activating a delete function.

Figure 10:
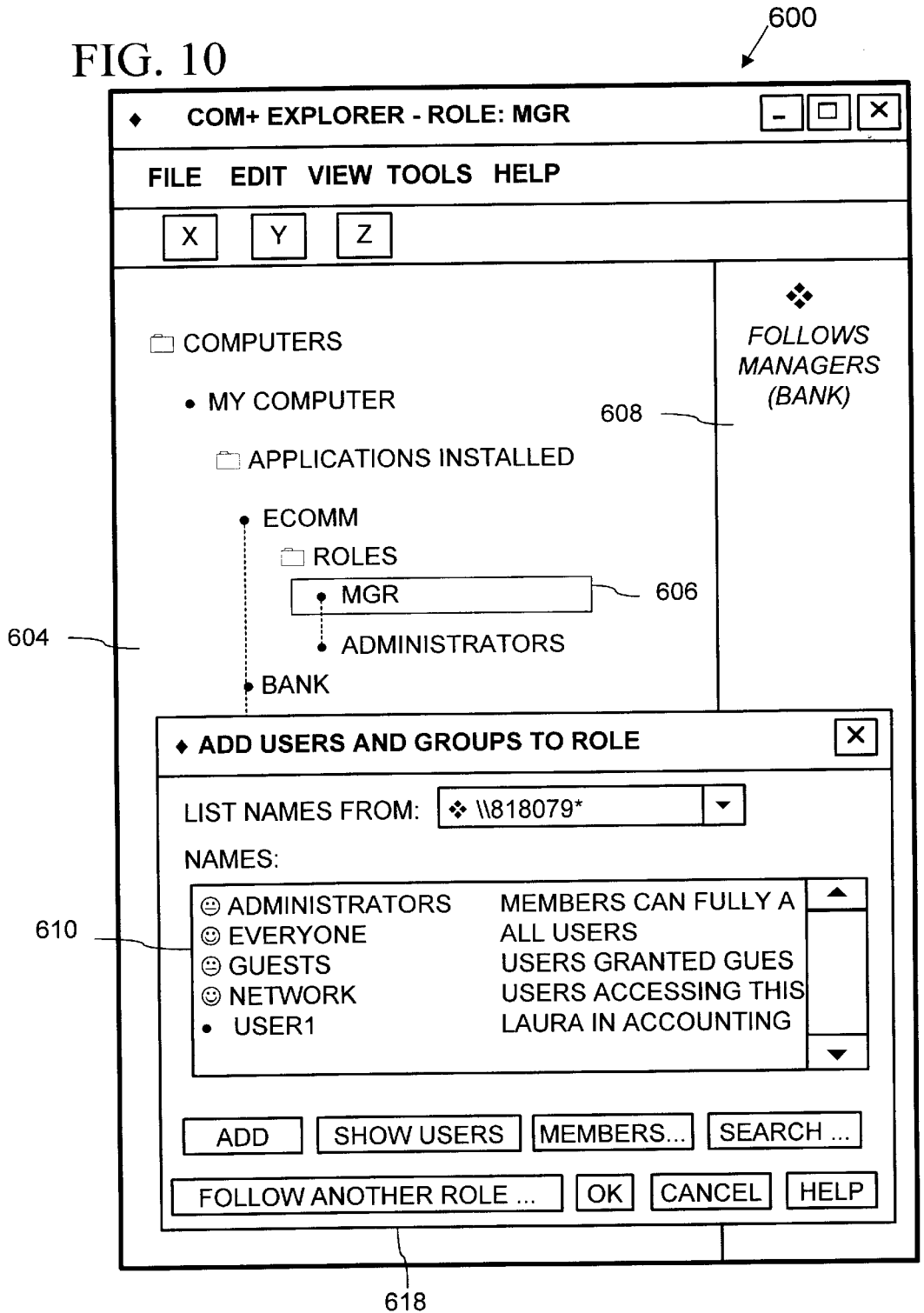
FIG. 10 is a view of a feature of the COM+ Object Explorer interface for specifying a first role follows a second role.

An optional feature shown in FIG. 10 allows a user to specify a first application role follows a second application role. The followed role serves as both an application role (because it was defined for an application at development) and a composite role (because it is bound to the following role). The window 600 shows the "mgr" role is selected for the application "Ecomm" in the pane 604. In the window 618, the user can select users and groups from the list 610 or activate a button to indicate the application role "mgr" should follow another role. In the example, the "mgr" role follows the application role "managers" in the application "Bank" as shown in the pane 608. The application role "managers" serves as a composite role.

Users bound to a followed role are considered members of any following roles. In the example, if a user "User2" were added to the "managers" role for the application "Bank," the user "User2" would also be a member of the "mgr" role. Multiple roles can follow a single role.

Figure 11:
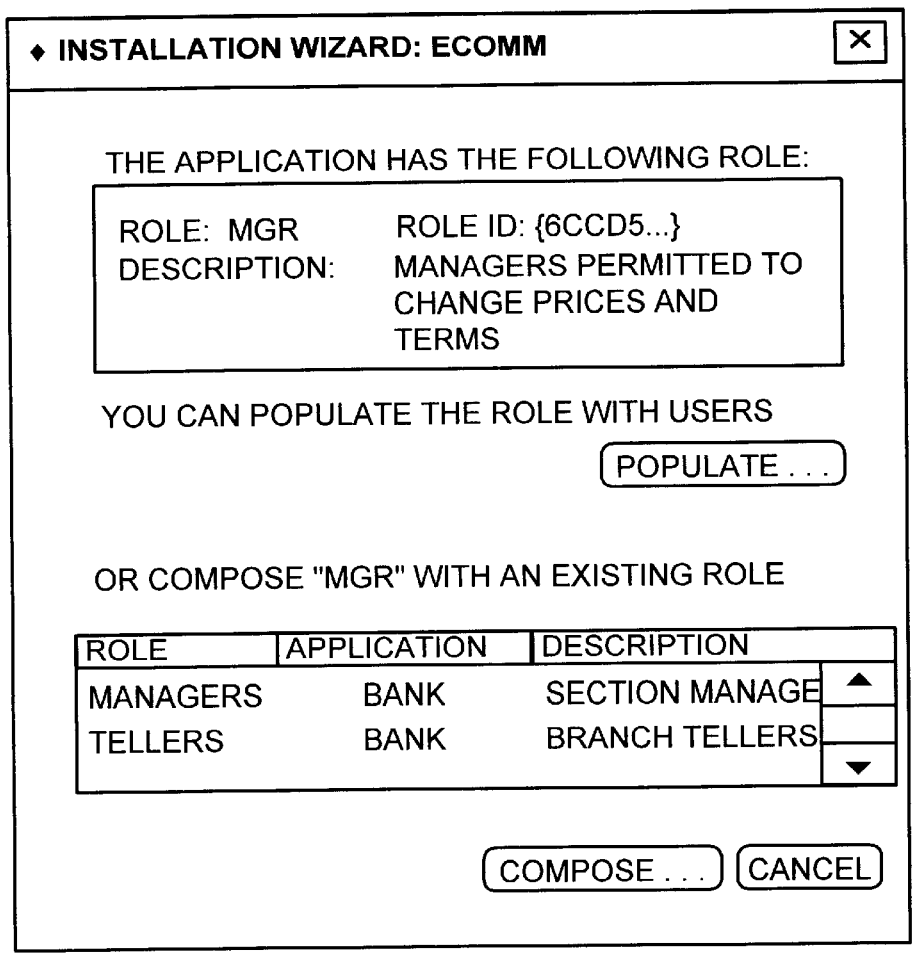
FIG. 11 is a view of a feature of an installation utility interface for assisting a deploying user with composing roles when installing an application.

Finally, during deployment of an application, a feature is presented to the administrator to facilitate composing a role in the application with roles already defined on the computer system. Typically, an administrator invokes an installation utility such as the "Installation Wizard" to deploy an application on the computer system. A view of an interface presented by an installation utility during deployment is shown in FIG. 11.

For each application role in the application being deployed, the installation utility presents a window 650. The window 650 provides information about the application role and gives the user the option to populate the application role or compose it with another role already defined on the computer system. If the "compose" option is selected, the application role is composed with the selected role using either the separate composite role technique or the following role technique described above.

If the separate composite role technique is used, the user is given an opportunity to name and describe the composite role; the user can then select to automatically populate the composite role with the users in the selected role already defined on the computer system. In this way, an administrator can compose two roles efficiently and easily.

When the administrator has completed selecting various groups and users for the roles, the various bindings have been preserved in the catalog, as shown in more detail below. The role settings can be modified after deployment by a user such as a system administrator with an appropriate password. Also, the interface of FIG. 7, normally presented to a developer, can be invoked by an administrator to modify access privileges granted to the roles.

Exemplary Data Structures for Implementing Composable Roles

In the illustrated embodiment, a wide variety of information related to the application, including the security-related settings, is stored in a central store called the catalog. As described earlier, settings for an application can be exported from the catalog for deployment on host computer systems. Typically information relating to composite roles is configured after the application is deployed, so such information is not stored in the catalog until after the application is deployed. However, such an arrangement might be desired under some distribution scenarios (e.g., a pre-bundled combination of two applications with pre-composed roles).

Figure 12A:
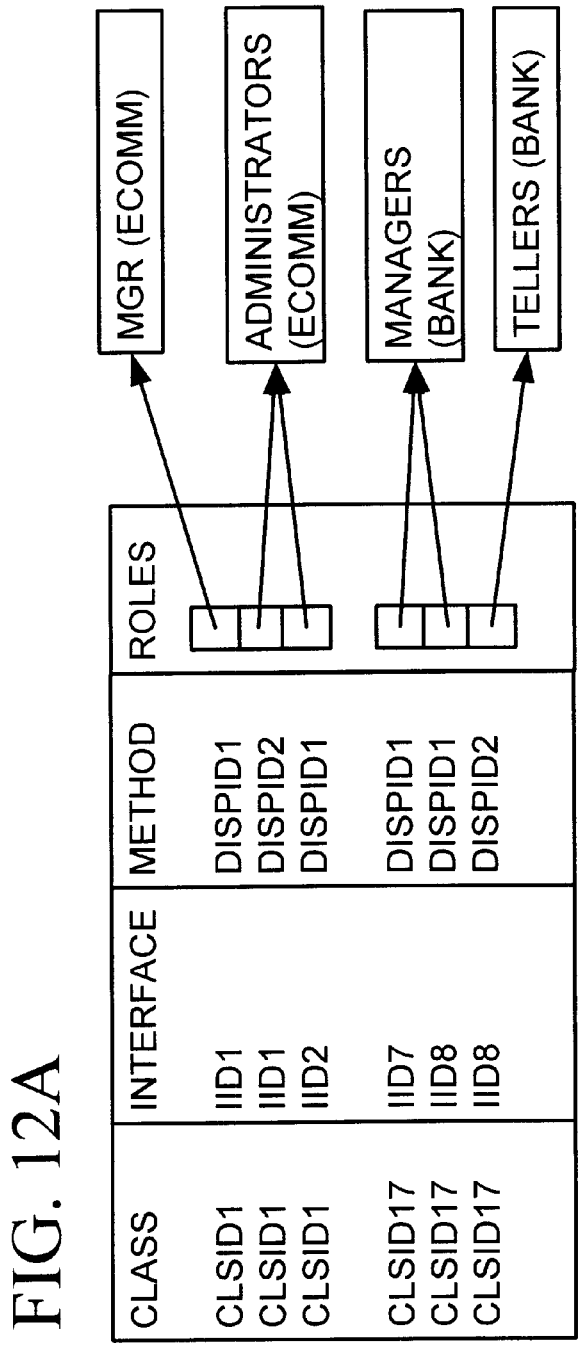
FIG. 12A is a block diagram showing a portion of a store called the catalog for controlling access privileges.

FIG. 12A shows a security-related portion of a catalog generated for an application by a developer. The catalog organizes various security settings by class, interface, and method. The entries in the catalog show which roles have access privileges for calls to the listed methods. Objects are denoted by their class identifier (CLSID), which is a globally unique identifier (GUID) identifying the object's class. An interface identifier (IID) identifies the interface, and a dispatch identifier (DISPID) identifies the method. Methods are commonly assigned a particular DISPID according to the position (e.g., 2) the method has in the interface declaration. In the example, a pointer references a list of roles, but alternative arrangements (e.g., an array) could be used instead. The roles are represented by their role id (also a GUID).

Figure 12B:
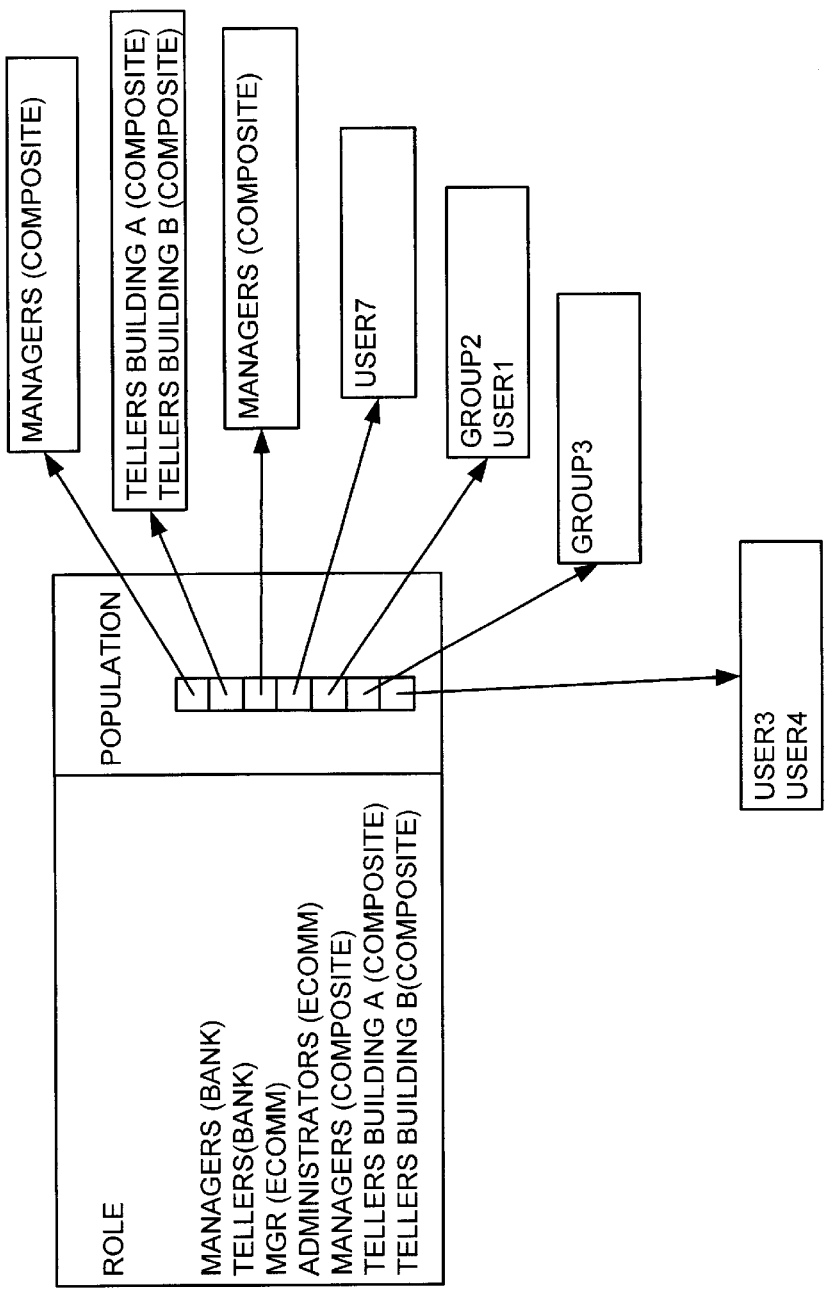
FIG. 12B is a block diagram showing a portion of the catalog for binding roles to users and groups using composite roles.

FIG. 12B shows another portion of the catalog indicating which users and groups are bound to what roles during deployment. Roles are represented by their role id, and the users and groups are represented by the security identifiers (SIDs) in the catalog. In addition to being bound to a particular set of users, a role can be bound to a composite role. Since the composite role is in turn bound to a particular set of users, the role can be said to be transitively bound to the set of users through the composite role. Care must be taken when constructing the catalog to avoid circular references (e.g., a composite role bound to itself).

In the example shown, the "mgr" role for the application "Ecomm" is bound to the composite role "managers," which is in turn bound to "group2" and "user1." Therefore, "group2" and "user1" are considered members of the "mgr" role. At runtime, the catalog is consulted to determine if a particular user is a member of a specified role, as discussed at length, below.

Figure 12C:
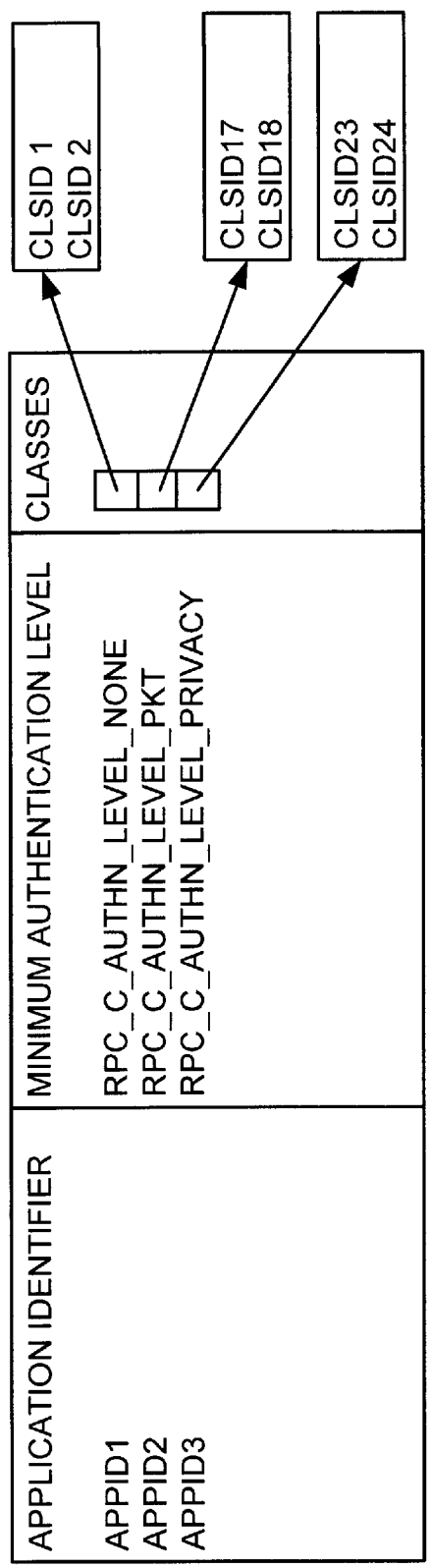
FIG. 12C is a block diagram showing a portion of the catalog for specifying a minimum authentication level for an application.

FIG. 12C shows a third portion of the catalog listing the application identifier (APPID) of each application, the minimum authentication level for calls to the application, and a list of class identifiers (CLSIDs) belonging to the application. In the example shown, AppId2 requires a minimum authentication level of RPC_C_AUTHN_LEVEL_PKT and consists of the objects represented by CLSID17 and CLSID18. An alternative implementation could have a minimum authentication level for each role or for each method.

In the various illustrated portions of the catalog, pointers are shown to illustrate bindings between elements (e.g., roles and users); however, bindings can be achieved in a variety of ways. For example, the pointers could be reversed or the elements could be doubly linked. In the illustrations, an identity is considered a member of a role if the role is mapped to the identity. In an implementation using composite roles, an identity is considered a member of a role if the role is mapped to the identity or if the role is mapped to a composite role mapped to the identity. Additional levels of indirection could be used to determine role members (e.g., a role mapped to an intermediary role, mapped to a composite role, mapped to an identity.) Although the security settings are shown in a catalog, the settings could alternatively be stored in a central configuration database in Windows NT called the registry.

Exemplary Runtime Operation of an Implementation of Composable Roles

At run time, a security service monitors calls to objects and limits access to those user identities that are members of the role associated with the method, interface, object, or application being called. One component of the security service includes a function which can be called to determine whether a caller is a member of a specified role; the function is defined as follows:

IsCallerInRole(BSTR bstrRole, BOOL*pfIsInRole)

This function can be called by application objects to programmatically enforce a custom security scheme other than that provided by the security service. For example, an object might use an "if" statement to allow users in the "tellers" role to change account balances by amounts less than $500 but require the user be in the "managers" role for higher amounts.

At runtime, the security service can be configured to use a hashing algorithm to find an entry in the catalog for a particular method of an interface to a class of objects. Finally, population information for certain repeatedly-used roles can be cached to increase performance.

Exemplary Security Framework for Implementing Composable Roles

The following describes a security framework in which composable roles can be implemented. The security framework executes in an environment supporting object contexts. Object contexts are an environment extensibility mechanism described at length in Thatte et al., "Environment Extensibility and Automatic Services For Component Applications Using Contexts, Policies And Activators," U.S. patent application Ser. No. 09/135,397, filed Aug. 17, 1998, the disclosure of which is incorporated herein by reference.

Intercepting Calls to Objects with a Wrapper

Figure 13:
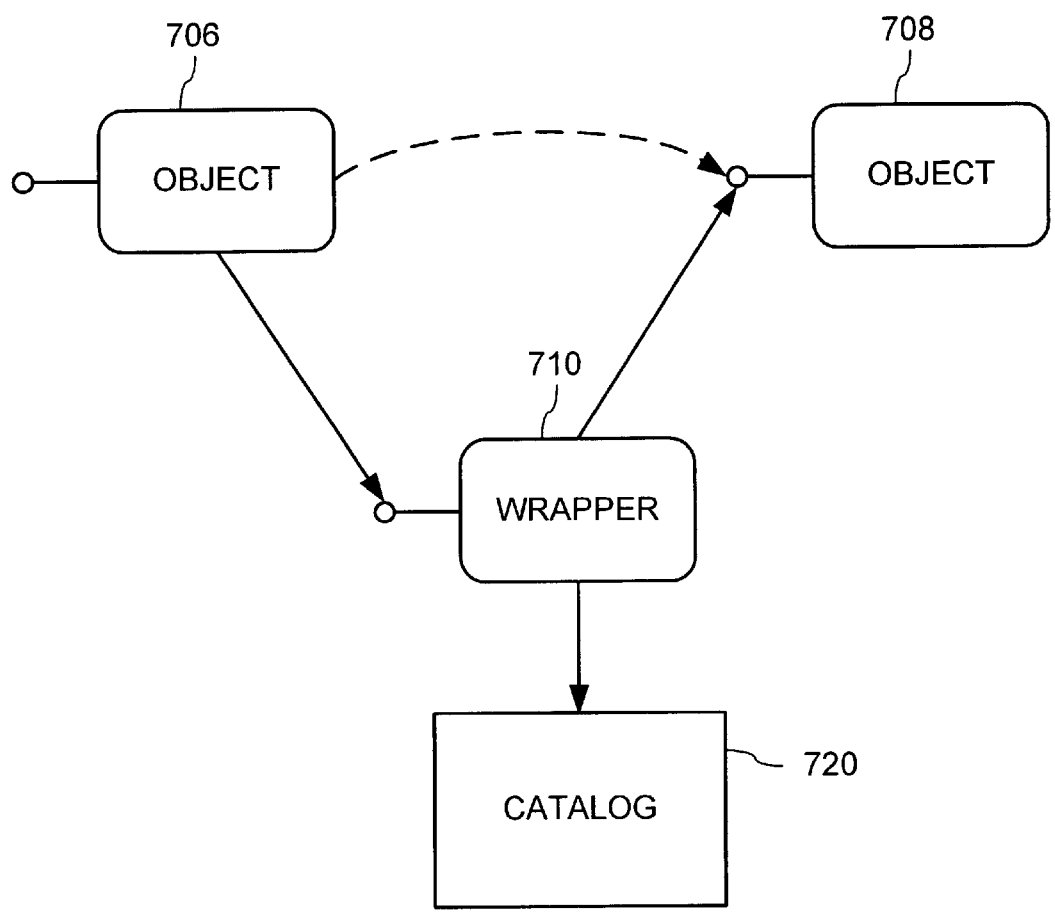
FIG. 13 is a block diagram of a wrapper arrangement for providing security services transparently to a calling and called object.

The security framework monitors calls to objects by intercepting calls to the components with a wrapper mechanism. FIG. 13 shows two objects, 706 and 708. In the illustrated arrangement, the objects are sometimes referred to as a client object 706 and a server object 708, since the object 706 accesses functionality of (i.e., is served by) the object 708. In some cases, the client object 706 might be a calling program other than an object; such a client is sometimes called a "base client." To indicate which user initiated execution of the objects, an identity is associated with calls from the client object 706 (e.g., the identity of a logged on user or an identity indicating the system user) as described in more detail below.

When the client object 706 attempts to access the functionality of the server object 708 it acquires a pointer to an interface of the server object 708 and issues a method call through the interface. As shown in FIG. 13, one of the features of the security framework is to interpose a wrapper 710 between the objects, through which calls to the server object 708 pass. The wrapper 710 invokes various security function calls to the operating system (e.g., to determine the identity of a user) and accesses a catalog 720 to determine whether to relay the call to the server object 708, if appropriate. One advantage of the illustrated arrangement is security settings can be changed by modifying the catalog 720 without modifying or recompiling the objects. Also, the security framework can be modified to incorporate new technologies or improvements without having to modify the objects. Finally, developers of the business logic of the objects can avoid becoming familiar with abstruse security logic, speeding and simplifying application development.

The wrapper 710 can be interposed between the objects in a variety of ways (e.g., by an object creation service when the server object 708 is instantiated, or by unmarshaling code when a reference to the object 708 is unmarshaled), as described in more detail below. Also, as described above, the catalog 720 can be created in a variety of ways, such as by a graphical user interface or with reference to declarations in source code. The result of the arrangement shown in FIG. 13 is objects execute without regard to the design of the security framework; in other words, the security framework is transparent to the objects.

Figure 14:
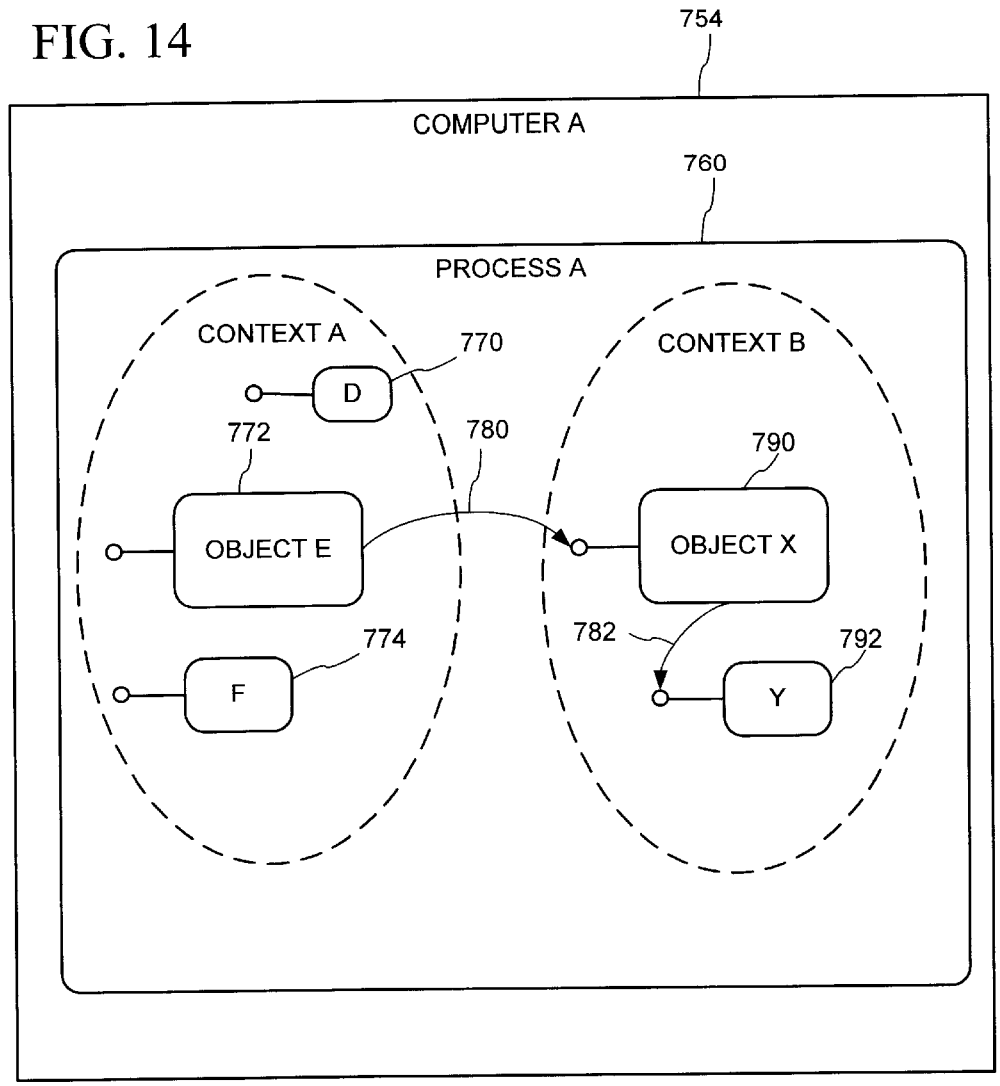
FIG. 14 is a block diagram of a security scheme in which objects of different applications are placed in different object contexts.

An exemplary use of the security framework to achieve security boundaries is shown in FIG. 14, wherein objects are shown as residing in object contexts. In summary, an object context is defined by its object context properties (e.g., a machine property, a process property, and an application property). If an object is in an object context having different object context properties from another object, the objects are said to be in different object contexts. A wrapper is automatically placed between references to objects residing in different object contexts when a cross-context reference is unmarshaled; the wrapper is provided with references to various policies as described below. The policies perform logic to establish an environment appropriate for the object context in light of the cross-context call. In the example, objects are associated with an application using an application identifier (a GUID). The application identifier is incorporated into the object's object context as one of the object context properties. Application identifiers can identify an application proper (e.g., a banking application) or various system services. Accordingly, objects having different application identifiers are placed into different object contexts and a wrapper is interposed between them. Associated policies perform logic (e.g., security checking) appropriate for a cross-application call.

With reference now to FIG. 14, various objects execute in a process 760 on a computer 754. The objects 770, 772, and 774 are members of one application and are accordingly placed in object context A; the objects 790, and 792 are members of another application and accordingly are placed in object context B. When an object in one application attempts to access the functionality of an object in the other application, a wrapper is automatically interposed between the object (e.g., the call 780 is directed to a wrapper; the call 782 is not). The wrapper is provided with a reference to a security policy, which performs the various functions described below, such as determining whether a caller is a member of a role having access privileges to the object. The wrapper can be implemented between objects on the same computer in the same process, across computers, and across processes.

Although the example in FIG. 14 incorporates an object's application identifier as one of the object context properties to place objects in an appropriate object context, the framework supports other arrangements. For example, a vendor identifier could be used. Information indicating the objects' object context properties is acquired from a central database of object properties (e.g., a registry or catalog) and at run time (e.g., to determine on which computer an object resides).

Windows NT Security Services

An example of an implementation of the security framework in the Windows NT operating system follows. The framework accesses various security services of the Windows NT operating system to implement a security scheme. For a more detailed description of the Windows NT security services, see Richard Grimes, "Professional DCOM Programming," pages 319–389 (Chapter 7, Security) 1997.

In summary, Windows NT identifies users and groups with unique identifiers called security IDs (SIDs). A collection of SIDs for the identity of a user, the groups to which the user belongs, and other related information, such as an impersonation level, is assembled into a single structure called a token.

A token is kept as part of a process's information to indicate the user initiating the process. By default, calls originating from the process are identified by the operating system as associated with the process's token. Alternatively, an identity can be kept as part of a thread's information (e.g., to facilitate impersonation of a remote user). For example, the thread on which the client object 706 (FIG. 13) is executing may be associated with a token. If so, calls on the thread are identified by the operating system as associated with the thread's token.

A network connection between two machines (e.g., over a LAN or the Internet) can provide a certain degree of confidence about identities reported over the connection.

Whenever a caller's identity is provided over a network connection, the degree of certainty about the caller's identity is represented as a particular authentication level. An authentication service includes authentication level information for identities reported over a network connection. When the authentication service creates a token, the authentication level information is not placed into the token, but the authentication level is available from Windows NT's security services.

Authentication levels supported by Windows NT include no authentication, connect level authentication, call level authentication, packet level authentication, packet integrity level authentication and encrypted packet authentication. At the authentication level "none," the user's identity is not available to the server. A higher authentication level (e.g., per-packet), indicates that some steps (i.e., each packet has been authenticated) have been taken to authenticate the user's identity. For example, the "connect" level indicates the user's identity was authenticated when the connection is first made (e.g., using a challenge/response scheme). The following table illustrates various authentication levels defined for Windows NT:

dence in the reported identity can be evaluated when performing security checks.

Windows NT supports a feature called impersonation, by which a calling program can take on the identity of another user (i.e., a user other than the user which created the process in which the calling program resides). In a typical arrangement, a server object impersonates a client program to access various resources on behalf of the client. Impersonation is achieved in Windows NT by accessing various security APIs, such as CoImpersonateClient( ) and CoRevertToSelf( ).

In addition, a client program can specify an impersonation level to control whether its identity can be impersonated. The following are exemplary impersonation levels defined in Windows NT:

TABLE 2

| Name | Description |
| --- | --- |
| RPC_C_AUTHN_LEVEL_NONE | No authentication. The user's identity is not available. |
| RPC_C_AUTHN_LEVEL_CONNECT | Authentication occurs when a connection is made to the server. Connectionless protocols do not use this, see _PKT, below. |
| RPC_C_AUTHN_LEVEL_CALL | The authentication occurs when a RPC call is accepted by the server. Connectionless protocols do not use this, see _PKT below. |
| RPC_C_AUTHN_LEVEL_PKT | Authenticates the data on a per-packet basis, all data is authenticated. |
| RPC_C_AUTHN_LEVEL_PKT_INTEGRITY | This authenticates that the data has come from the client, and it checks that the data has not been modified. |
| RPC_C_AUTHN_LEVEL_PKT_PRIVACY | In addition to the checks made by the other authentication techniques, this encrypts the packet. |

In the illustrated security framework, the identity of a user as reported by the system (if any) is associated with the Windows NT authentication level used to authenticate the identity. In this way, both the reported identity and confi-

TABLE 3

| Name | Description |
| --- | --- |
| RPC_C_IMP_LEVEL_ANONYMOUS | The client is anonymous, and the server cannot determine the client's identity. |
| RPC_C_IMP_LEVEL_IDENTIFY | The sever can impersonate the client to check permissions in an Access Control List, but cannot access system objects. This is typically the default value. |
| RPC_C_IMP_LEVEL_IMPERSONATE | The server can impersonate the client, and access system objects on the client's behalf. |
| RPC_C_IMP_LEVEL_DELEGATE | In addition to the _IMPERSONATE level, this level can impersonate the client on calls to other servers. |

A client specifies its security settings by placing values into a structure (i.e., COAUTHINFO) and calling the appropriate API, such as CoInitializeSecurity( ) or CoGetClassObject( ). Calls from the client to servers are then associated with the specified settings.

Overview of Object Contexts, Activators, Policy Makers, and Policies

Figure 15:
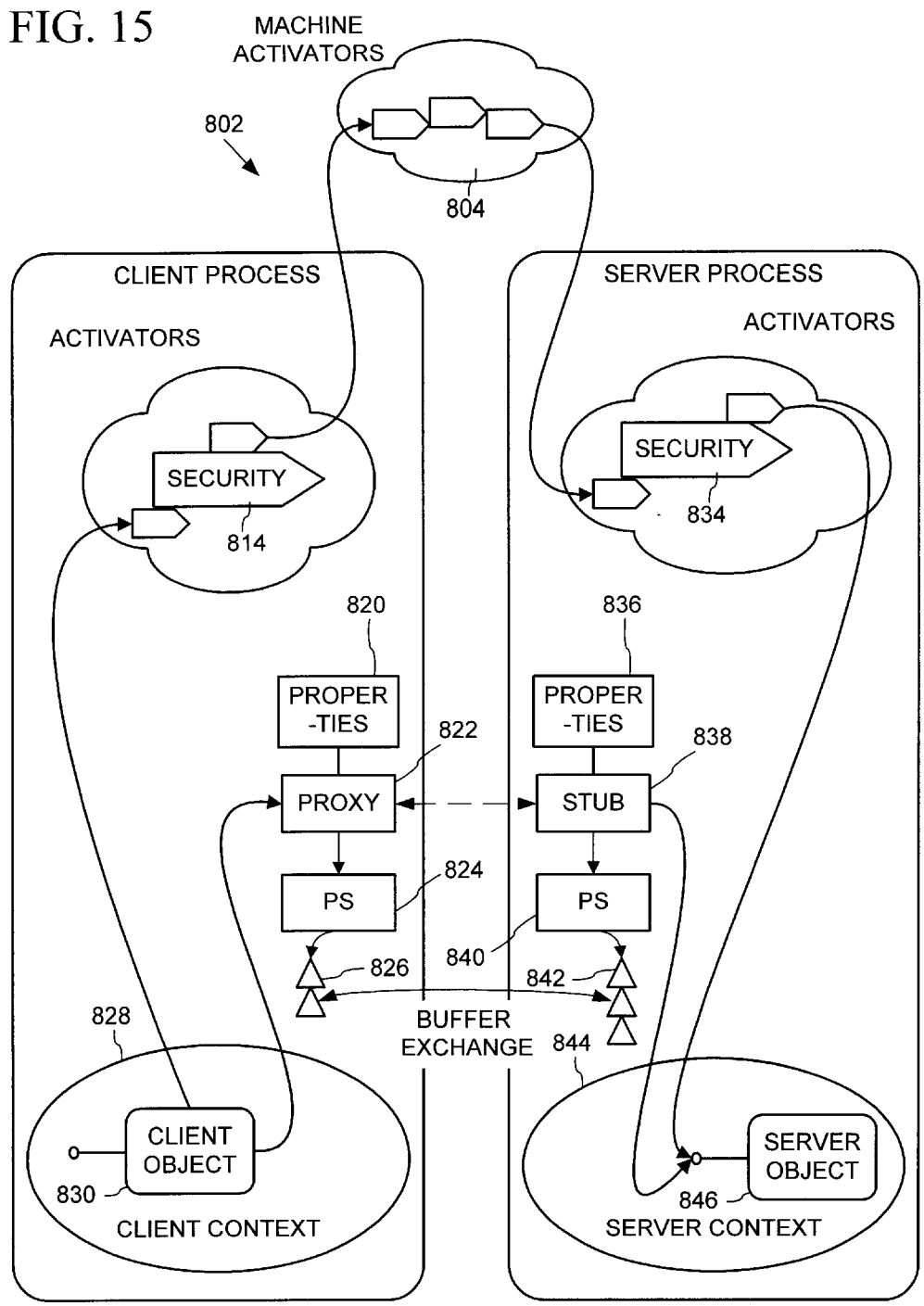
FIG. 15 is a block diagram illustrating object instantiation and method invocation in an environment supporting object contexts.

The following description details an implementation of the security framework in a COM+ environment supporting object contexts and related services. An example of object instantiation in an environment 802 supporting object contexts is shown in FIG. 15.

In the example, the two objects 830 and 846 are members of different applications. When the object 830 (also called a client object) wishes to access the functionality of the object 846 (also called a server object), it does so by requesting an interface to an instantiated instance of the object 846. The reference is acquired by supplying the class identifier of the server object 846 to an enhanced version of the "CoCreateInstance( )" object creation API, which employs a chain of activators associated with the server object 846. The activators assemble a set of object context properties to define the object context in which the created object resides. The activators may be standard activators, or activators specific to the requested object class or the location (e.g., machine activators 804). In the illustrated example, automatic security has been set for the server object 846, and the catalog so indicates; so security activator 834 is included in the activation chain when objects of the server object's class are instantiated. As shown in FIG. 15, the arrangement could be extended by including an optional security activator 814 on the client side. However, security could be implemented solely on either side (e.g., only on the server side). An alternative implementation uses a standard activator to determine whether automatic security is set for the object and sets an appropriate object context property indicating automatic security.

In some cases, traversal of the activation chain results in the server object 846 being created in the same object context as the client object 830 that requested its creation (i.e., the client object context 828). In other cases, the traversal results in the object 846 being created in another object context (i.e., a separate server object context 844). If the resulting object context does not yet exist, the activation chain creates the server object context 844 (i.e., by assembling appropriate object context property objects 836). In still other cases, the activation chain can terminate activation of the object (e.g., if security so requires), or defer activation.

In the illustrated example, the activation chain begins with an initial delegation to an activator (termed the "immediate activator") by the "CoCreateInstance( )" or other object creation API. This initial delegation by the "CoCreateInstance( )" API is to a class-specific activator (i.e., specific to the server object's class) if any is designated for the class. The class-specific activator can implement specific processing for the class during instantiation, such as setting particular object context properties (e.g., automatic security) when objects of the class are instantiated. Otherwise, if no class-specific activator is designated for the class, the "CoCreateInstance( )" API delegates to a default activator of the client object context 828. The default client object context activator can implement activation processing specific to a particular type of object context. For example, object contexts that incorporate particular domain-specific behaviors (e.g., automatic security) can provide a default activator to set object context properties specific to the behaviors (such as to screen inter-application calls). Finally, if the client object context 828 does not provide a default activator, the "CoCreateInstanceo" API initially delegates to a default object context activator.

The activators in the activation chain determine in which object context an object will reside by assembling a set of object context properties (e.g., the process in which an object resides and the application to which an object belongs). The object context properties are embodied in object context property objects, which can have a variety of interfaces. In the illustrated example, one of the object context property objects embodies an application identifier indicating to which application an object belongs.

After assembling the object context properties 820 and 836 of the object, the object context property objects having a policy maker interface (i.e., IPolicyMaker) are consulted and may contribute policies to the policy set. The policy set may be assembled at instantiation time, or alternatively be deferred until the reference to the server object 846 is first used (e.g., at unmarshaling time). The various policy set references 824 are available to the proxy 822, and the policy set references 840 are available to stub 838 on the server side. As a result, the proxy/stub arrangement functions as a wrapper between the client object 830 and the server object 846. Subsequently, when a cross-context object reference is used to access the interface to the server object 846, logic contained in the policies contributed to the object's policy set is executed automatically and transparently to the objects 830 and 846.

In the illustrated example, an object context property object for representing the application to which the server object belongs has a policy maker interface and contributes a security policy 826 to the policy set if two objects are in different applications, such as the server object 846 and the client object 830. If a call is made to the server object 846, the security policy 826 is automatically executed transparently to the caller and the called object; thus, security requirements for an object can be enforced even though the object itself contains no security logic.

Similarly, on the server side of the arrangement, a stub 838 has access to a security policy 842, which is placed in the policy set references 840. After instantiation is complete, the client object 830 is provided a reference to the proxy 822 instead of a direct reference to the server object 846. When a call is made to the server object 846, the proxy 822 marshals the call's parameters and relays the call to the stub 838, which unmarshals the parameters and relays the call to the server object 846. The proxy and stub automatically invoke the policies in the policy set at various stages during the call to the server object 846. Each policy has an interface (i.e., Ipolicy) to which four events are sent: call, enter, leave, and return. Upon receiving the event, the policy executes logic particular to the event, if any. A method call to the server object 846 results in the following sequence of events:

TABLE 4

1. Issue method call from client program (e.g. object 830) to proxy
2. Issue call event to policies to client-side policy set
3. Direct call to stub
4. Issue enter event to server-side policy set
5. Execute object method, return results to stub
6. Issue leave event to client-side policy set TABLE 4-continued 7. Return method results to proxy
8. Issue return event to client-side policy set
9. Return method results to client program Calls to the policies can result in termination of the steps listed above, thus effectively terminating the call. For example, a security policy called in step 4 could indicate a calling client object does not have access privileges, causing step 5 to be skipped (steps 6–9 would still execute, but they would be notified the call failed due to lack of access privileges).

In addition, the various policies can communicate via a buffer transfer mechanism. Finally, a policy can provide a result indicating the call not be forwarded to the server object 846, thereby enforcing a security boundary. The example of FIG. 15 shows a cross-process call; however, object contexts can be implemented in a single process, as described below and shown in FIG. 16.

Figure 16:
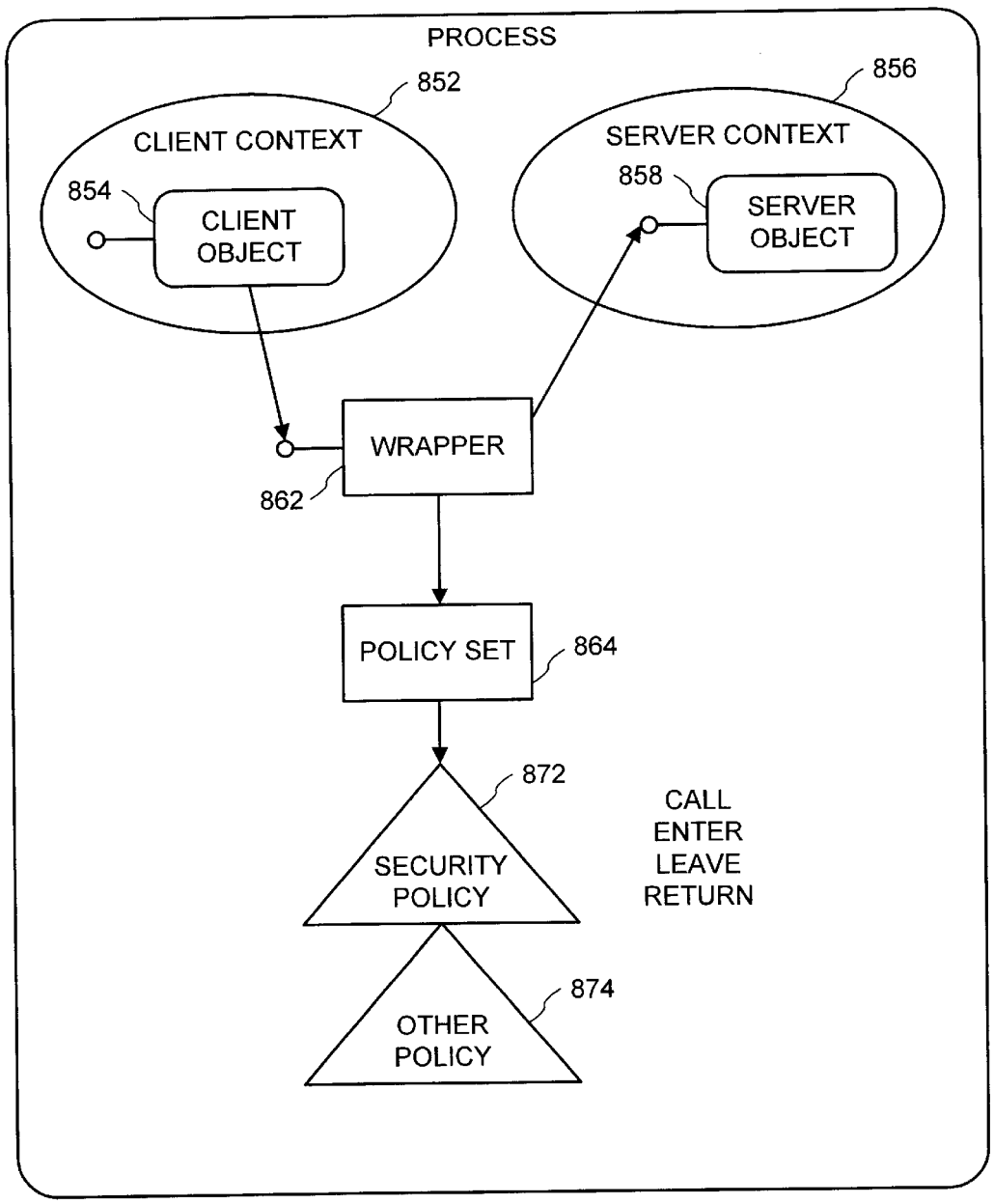
FIG. 16 is a block diagram illustrating a lightweight wrapper arrangement for supporting object contexts within a process.

FIG. 16 shows an exemplary arrangement employing a security policy in an intra-process call. Calls from the client object 854 to a server object 858 are first directed to a wrapper 862, which consults the policy set references 864, including a reference to a security policy 872 and another policy 874. A single security policy 872 can contain logic for call, enter, leave, and return events. The illustrated wrapper 862 is a lightweight replacement for a proxy-stub combination; the wrapper 862 marshals interface pointers but not other parameters passed to the server object 858.

The wrapper 862 executes the security policy transparently to the objects 854 and 858. Another way of describing the arrangement of FIG. 16 is to assert the client object 854 is in an object context 852 and the server object 858 is in a different object context 856. Calls between the object contexts are automatically intercepted by the wrapper 862, providing a security boundary between the object contexts.

Exemplary Runtime Security Service

Figure 17:
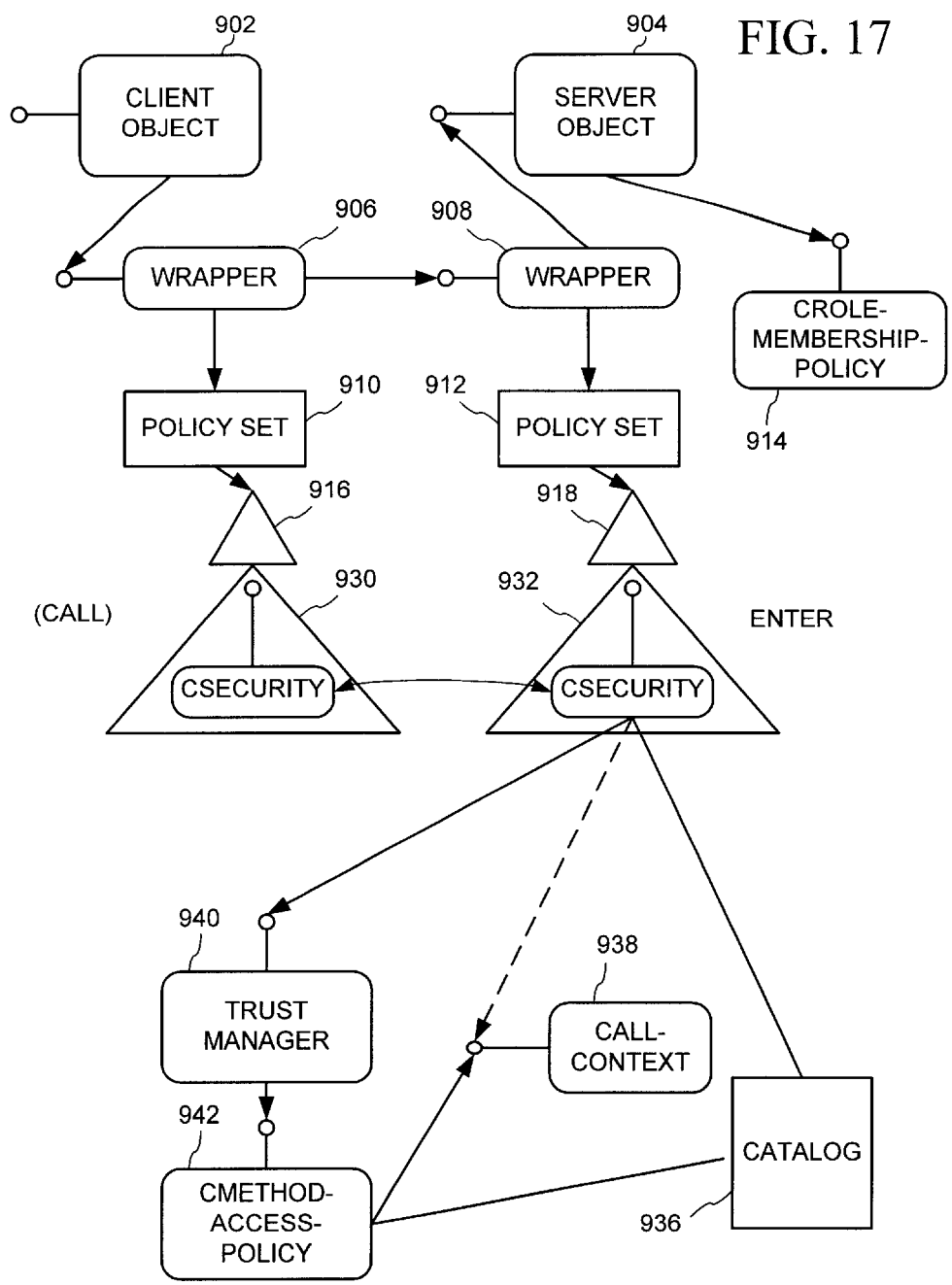
FIG. 17 is a block diagram illustrating an exemplary runtime security service.

FIG. 17 shows an exemplary runtime security service implemented with the security framework described above. In the example, a client object 902 accesses the functionality of a server object 904 through a pair of wrappers 906 and 908 transparently interposed between the two objects during instantiation of the server object 904 as described above. The two objects 902 and 904 are of different applications. The client object 902 alternatively can be a base client instead of an object.

The wrapper 906 accesses the policy set references 910, including a reference to the security policy (CSecurity) 930 automatically included in the policy set because the two objects are of different applications (i.e., they have different object context properties and reside in different object contexts). Another policy 916 is optionally included in the policy set. The interface presented by the wrapper 906 appears to the client object 902 to be the interface presented by the server object 904. When the security policy 930 is created, it receives the class identifier of the server object 904.

The wrapper 908 accesses policy set references 912, including a reference to the security policy (CSecurity) 932 automatically included in the policy set because the two objects are of different applications (i.e., they have different object context properties and reside in different object contexts). Another policy 918 is optionally included in the policy set. When the security policy 932 is created, it receives the class identifier of the server object 904.

When the client object 902 attempts to access a method of the server object 904, the wrapper 906 automatically sends a "call" event to the security policy 930. Upon receiving the call event, the security policy 930 can optionally perform client-side security checks similar to the ones described for the server-side below. In this way, calls are blocked before being sent over to the server side. If access checks fail according to the security policy 930, the call is not forwarded to the wrapper 908.

Figure 18:
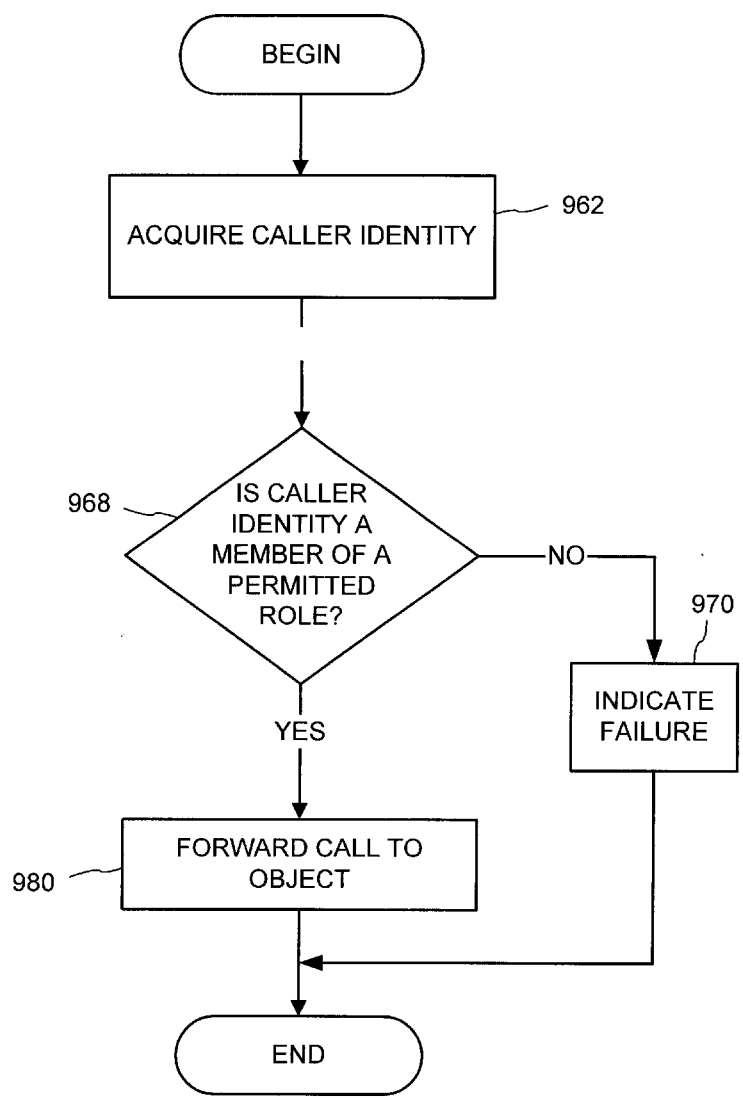
FIG. 18 is a flowchart of an exemplary method implemented by a runtime security service.

When the call is forwarded to the wrapper 908, the wrapper sends an "enter" event to the security policy 932. A flowchart describing an exemplary method employed by the security policy 932 is shown in FIG. 18. The security policy 932 acquires the caller's identity and associated authentication information (step 962) (sometimes called the "call context") using a system call (e.g., CoGetCallContext). The call context is returned via a call context object 938 and includes a reference to a token associated with the caller. The COM+ component of the operating system provides either the token associated with the calling object's process or the token associated with the calling object's thread, if any. The authentication level is acquired from the COM+ component of the operating system, which in turn acquires it from the RPC layer.

The security policy 932 now compares the identity of the caller stored by the call context object 938 with the values specified in the catalog to determine whether to allow the call to the server object 904 (step 968). In the illustrated embodiment of FIG. 17, the security policy 932 employs a trust manager component 940 to determine whether the caller is a member of a role permitted for the object (or the object's interface or method), passing a reference to the call context object 938. The trust manager 940 in turn relays the determination to the method access policy component 942, which references the catalog and the call context object 938 to determine whether the call should be allowed (e.g., by determining if the authentication level is satisfied and whether the caller is a member of a permitted role).

To determine whether the caller is a member of a permitted role, the method access policy component 942 consults the catalog 936. To improve performance, the method access policy 942 can be configured to maintain a cache of catalog entries. If roles in the catalog 936 include composite roles, the method access policy component 942 handles them appropriately. Specifically, it is determined whether a permitted role is mapped to a composite role; if so, it is determined whether the composite role is mapped to the caller's identity. A mapping from a permitted role to a composite role to the caller's security identifier indicates the caller is a member of a permitted role. The method access policy component 942 also indicates a caller is a member of a permitted role if the permitted role is mapped directly (i.e., not through a composite role) to the caller's identity.

Further, if a permitted role is mapped to a group identity to which the caller belongs, the method access policy component 942 indicates the caller is a member of a permitted role. If the caller's token fails to indicate to which groups the caller belongs, the security identifiers of the user's groups can also be determined at runtime and cached for future reference.

If the membership access policy component 942 indicates the caller is not a member of a permitted role (or the authentication level is too low), the security policy 932 returns a result indicative of failure (step 970). The failure result is relayed back to the wrapper 906 and the client object 902.

If the membership access policy component 942 does indicate the caller is a member of a permitted role (and the authentication level is high enough), the call is forwarded to the server object 904 (step 980). When the call completes, its results are relayed back through the wrapper arrangement to the client object 902.

Optionally, the server object 904 can programmatically determine whether its caller is in a specified role using a role membership policy component 914, which has access to the catalog 936 (the link to the catalog 936 is not shown). In this way, a developer can include system calls in server object 904 to access various functions (e.g., IsCallerInRole( )) to implement a custom security scheme taking advantage of composite roles.

Having described and illustrated the principles of my invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto:

I claim:

1. A computer-implemented method of defining security for an application set comprising at least one application, the method comprising:

at development of an application in the application set, defining a plurality of roles for the application to specify access privileges to processing services provided by the application;

at deployment of the application, binding one of the roles to a composite role;

at deployment of the application, binding the composite role to at least one user identity; and at runtime of the application, granting a user identity access to a processing service provided by the application if a role having access privileges to the processing service is bound to a composite role bound to the user identity.

2. The method of claim 1 wherein the processing services provided by the application comprise an object, an interface, and a method.

3. A computer-readable medium having computer-executable instructions for performing the steps of claim 1.

4. The method of claim 1 wherein a role defined for a first application and a role defined for a second application are bound to the composite role.

5. The method of claim 1 wherein a plurality of roles are bound to the composite role, the method further comprising:

altering identities having access privileges for processing services defined for the plurality of roles bound to the composite role by altering the identities bound to the composite role.

6. A computer-implemented method of providing runtime security to an object application set comprising at least two applications, wherein processing services are provided by the applications in the application set, the method comprising:

at development of applications in the application set, performing the steps of:
   (a) defining a plurality of roles for the application; and
   (b) declaring access privileges of the roles to the processing services of the application; and at deployment of the applications in the application set on a computer system having a security configuration comprising a plurality of identities associated with users, performing the steps of:
   (a) binding at least one of the roles to at least one composite role; and
   (b) binding the composite role to at least one of the identities.

7. A computer-readable medium having computer-executable instructions for performing the steps of claim 6.

8. The method of claim 6 further comprising:

at runtime, providing an affirmative response to a request to determine whether a specified identity is a member of a role if the specified identity is bound to a composite role bound to the role.

9. The method of claim 6 wherein at least one composite role is also an application role defined at development of an application.

10. The method of claim 6 wherein at least one composite role is bound to a plurality of application roles, wherein a first application role of the application roles is an application role defined at development time of a first application, and a second application of the application roles is an application role defined at development time of a second application different from the first.

11. The method of claim 6 wherein a first application is installed on a host computer, the method further comprising:

at deployment of a second application on the host computer, automatically selecting a new role from the second application; and binding the new role to a composite role having members identical to those bound to a role in the first application.

12. The method of claim 11 wherein the selecting step is performed by an installation utility and the role in the first application is selected by a user from a list of roles in the first application presented by the installation utility.

13. In a computer system having a security configuration comprising a plurality of identities associated with users, a computer-implemented method of enforcing security for a first application and a second application, wherein the first application provides a first group of processing services and the second application provides a second group of processing services, wherein access privileges to the first group of processing services is limited to a first set of roles declared at development time of the first application and access privileges to the second group of processing services is limited to a second set of roles declared at development time of the second application, the method comprising:

defining at least one composite role;

populating the composite role with a set of user identities;

mapping at least a first role from the first set of roles and a second role from the second set of roles to the composite role;

at runtime, determining whether an identity is a member of a role mapped to the composite role by comparing the identity to the set of user identities populating the composite role; and denying access to a processing service if the processing service is requested by a user identity not a member of a role having access privileges to the processing service.

14. A computer-readable medium having computer-executable instructions for performing the steps of claim 13.

15. A computer-implemented method of installing a package having a first set of roles defined for a first application on a computer system having installed thereon a second application, wherein a second set of roles for the second application is defined in a catalog on the computer system, the method comprising:

- importing the roles defined for the first application from the package into the catalog;
- composing the first and second applications by binding in the catalog a first role defined for the first application to a second role defined for the second application.

16. A computer-readable medium having computer-executable instructions for performing the steps of claim 15.

17. The method of claim 15 further comprising:

altering membership of the first role and the second role by performing a change operation on membership of the second role.

18. A security administration utility for managing membership of roles defined for a plurality of applications installed on a host computer system, the administration utility comprising:

- code for presenting a graphical user interface for selecting one of the roles and populating the selected role to add identities to the selected role's membership;
- code for composing a first one of the roles and a second one of the roles having a membership by binding the first role to the membership of the second role; and
- code for writing the role's bindings to a central store on the host computer system.

19. The security administration utility of claim 18 wherein the code for composing composes two roles by binding a role identifier for the first role to a role identifier for the second role.

20. The security administration utility of claim 18 wherein the code for composing composes two roles by binding a role identifier for the first role and a role identifier for the second role to a role identifier for a composite role.

21. A security service for monitoring calls to a plurality of secured objects to limit access to the secured objects to specified sets of user identities, the service comprising:

- a central store of security settings comprising:
  - (a) entries binding roles to identities, wherein at least two roles are transitively bound to a same set of identities by being bound to a composite role bound to the set of identities; and
  - (b) entries indicating which roles have access privileges to the secured objects;
- a role membership manager operative to add an additional identity to the composite role by binding the composite role to the additional identity; and
- a runtime service operative to monitor a call to one of the secured objects, the runtime service further operative to determine a caller identity associated with the call and allow the call only if the central store indicates the caller identity is bound to a role having access privileges to the secured object, wherein transitively bound identities are considered bound identities.

22. The security service of claim 21 wherein access to a first one of a secured object's methods is limited to a different role than a second one of the secured object's methods.

23. The security service of claim 21 further comprising:

a runtime service operative to receive a specified role from an inquiring caller and further operative to indicate the inquiring caller to the runtime service is in the specified role if the inquiring caller's identity is bound to the role, wherein transitively bound identities are considered bound identities.

24. The method of claim 23 wherein the runtime service is implemented in a wrapper interposed before the called secured object.

25. A computer-readable medium having stored thereon a data structure for limiting access to processing services provided by a plurality of object-based applications having roles for defining access to the processing services by mapping processing services to user identifiers, the data structure comprising:

- for each application, a set of processing service entries binding a processing service with a role permitted to access the processing service;
- at least one composite role entry binding a first role defined for a first application with a second role defined for a second application; and
- for each composite role entry, a set of user identifiers bound to the composite role entry;
- wherein the data structure maps a particular processing service to a particular user identifier if the particular processing service is bound to a particular role, the particular role is bound to a particular composite role, and the particular role is bound to the particular user identifier.

26. The computer-readable medium of claim 25 wherein the processing services are object methods.

27. The computer-readable medium of claim 25 wherein bindings for each composite role entry are specified using a graphical user interface depicting the composite role as an icon.

* * * * *

UNITED STATES PATENT AND TRADEMARK OFFICE
CERTIFICATE OF CORRECTION

PATENT NO. : 6,574,736 B1 Page 1 of 1
DATED : June 3, 2003
INVENTOR(S) : Andrews It is certified that error appears in the above-identified patent and that said Letters Patent is hereby corrected as shown below:

Title page,
Item [56], References Cited, OTHER PUBLICATIONS, "Orfali et al." reference, "Tranaction" should read -- Transaction --.

Column 20,
Line 5, "CoCreateInstanceo" should read -- CoCreateInstance() --.

Column 23,
Line 12, "( )" should read -- () --.

Signed and Sealed this

Fifteenth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,574,736 B1 Page 1 of 1
DATED : June 3, 2003
INVENTOR(S) : Andrews It is certified that error appears in the above-identified patent and that said Letters Patent is hereby corrected as shown below:

Title page,
Item [56], References Cited, U.S. PATENT DOCUMENTS,
Insert the following omitted references, -- 5,758,281 5/1998 Emery et al.;
5,764,747 6/1998 Yue et al.;
5,764,918 6/1998 Poulter; 5,768,348 6/1998 Solomon et al. --
OTHER PUBLICATIONS,
"Orfali et al." reference, "Tranaction" should read -- Transaction --.
Insert the following omitted references
-- Tomsen, "Virtually Crash-Proof Your Web Site with IIS 4.0," *Microsoft Interactive Developer, 2:10*, pp. 41-46 (October 1997);
"Chapter 9: Connectable Objects," pp. 1-12, http://www.microsoft.com/oledev/olecom/Ch09.htm, (June 22, 1998); Cugini and Ferraiolo, "Role Based Access Control Slide Set - May 1995," National Institute of Standards and Technology, 25 pp. (May 1995); Smith, Sr. et al., "A Marketing Survey of Civil Federal Government Organizations to Determine the Need for a Role-Based Access Control (RBAC) Security Product," Seta Corporation, 84 pp. (July 1996). --

Column 2,
Line 35, "Tranaction" should read -- Transaction --.

Column 20,
Line 5, "CoCreateInstanceo" should read -- CoCreateInstance() --.

Column 23,
Line 12, "( )" should read -- ()) --.

This certificate supersedes Certificate of Correction issued February 15, 2005.

Signed and Sealed this

Fourteenth Day of June, 2005

JON W. DUDAS
*Director of the United States Patent and Trademark Office*